(12) United States Patent
Ito et al.

(10) Patent No.: US 7,545,832 B2
(45) Date of Patent: Jun. 9, 2009

(54) RADIO COMMUNICATION SYSTEM, TRANSMITTING APPARATUS, RECEIVING APPARATUS, PROCESSING METHOD AND PROGRAM

(75) Inventors: Osamu Ito, Tokyo (JP); Kunio Fukuda, Tokyo (JP)

(73) Assignee: Sony Corporation (JP)

( * ) Notice: Subject to any disclaimer, the term of this patent is extended or adjusted under 35 U.S.C. 154(b) by 597 days.

(21) Appl. No.: 10/834,762

(22) Filed: Apr. 29, 2004

(65) Prior Publication Data
US 2005/0002421 A1    Jan. 6, 2005

(30) Foreign Application Priority Data
Apr. 30, 2003 (JP) ............................. P2003-125198
Oct. 16, 2003 (JP) ............................. P2003-355847

(51) Int. Cl.
*H04J 1/00* (2006.01)
(52) U.S. Cl. ....................................................... 370/480
(58) Field of Classification Search ........................ None
See application file for complete search history.

(56) References Cited

U.S. PATENT DOCUMENTS

| 2004/0038697 A1* | 2/2004 | Attar et al. .................. 455/522 |
| 2005/0289434 A1* | 12/2005 | Kim .......................... 714/755 |
| 2006/0040702 A1* | 2/2006 | Willenegger et al. ........ 455/525 |

FOREIGN PATENT DOCUMENTS

JP    2002344965 A   * 11/2002

* cited by examiner

*Primary Examiner*—Ricky Ngo
*Assistant Examiner*—Clemence Han
(74) *Attorney, Agent, or Firm*—Lerner, David, Littenberg, Krumholz & Mentlik, LLP

(57) ABSTRACT

A transmitting apparatus includes a data dividing unit operable to divide data into pieces of transmittable data, a data outputting unit operable to add a distribution order to the divided pieces of transmittable data to form transmission data, and a transmitter operable to transmit the transmission data in different transmission paths simultaneously. As a result, the effects of using different transmission paths simultaneously and efficient transmission by a form of transmission corresponding to a state of communication are realized.

9 Claims, 20 Drawing Sheets

F I G. 6
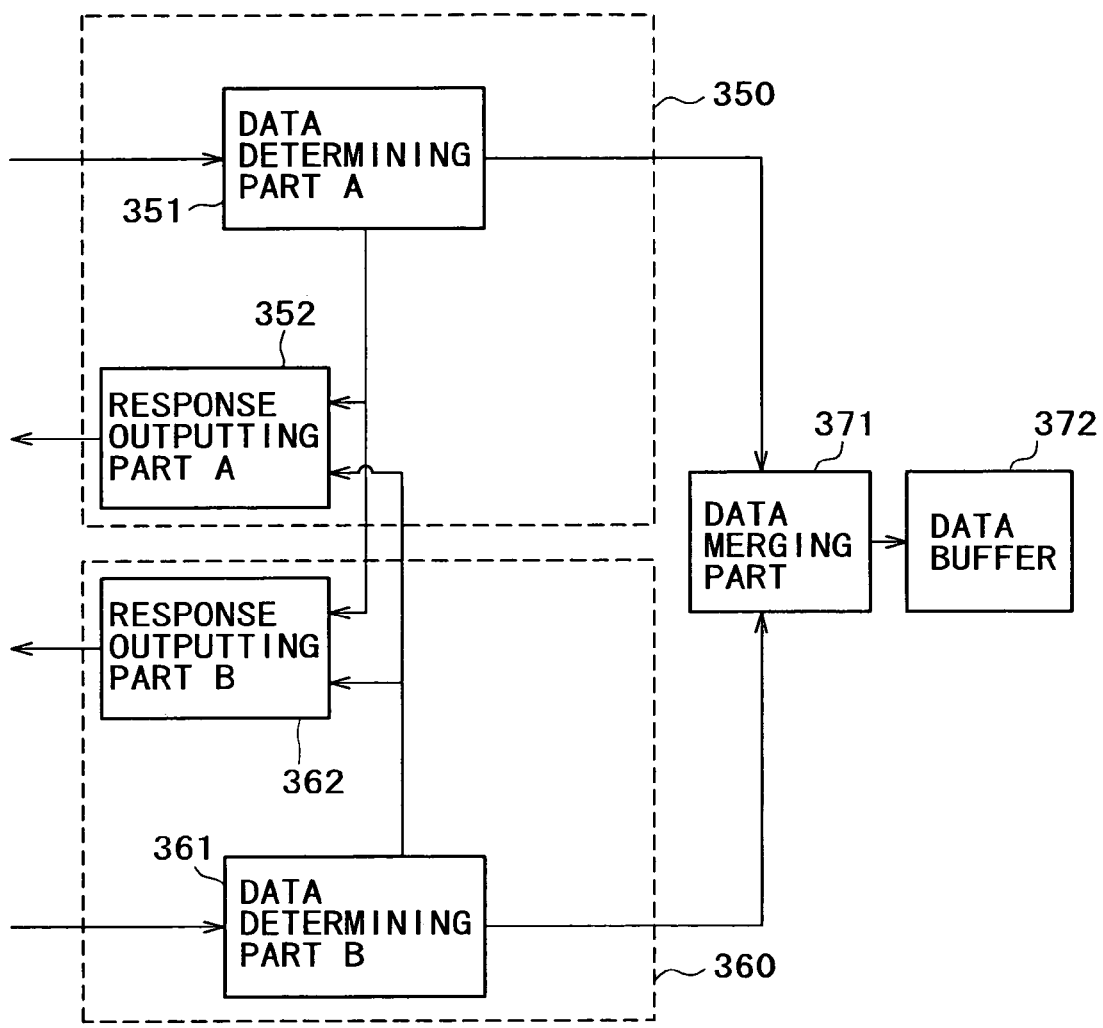

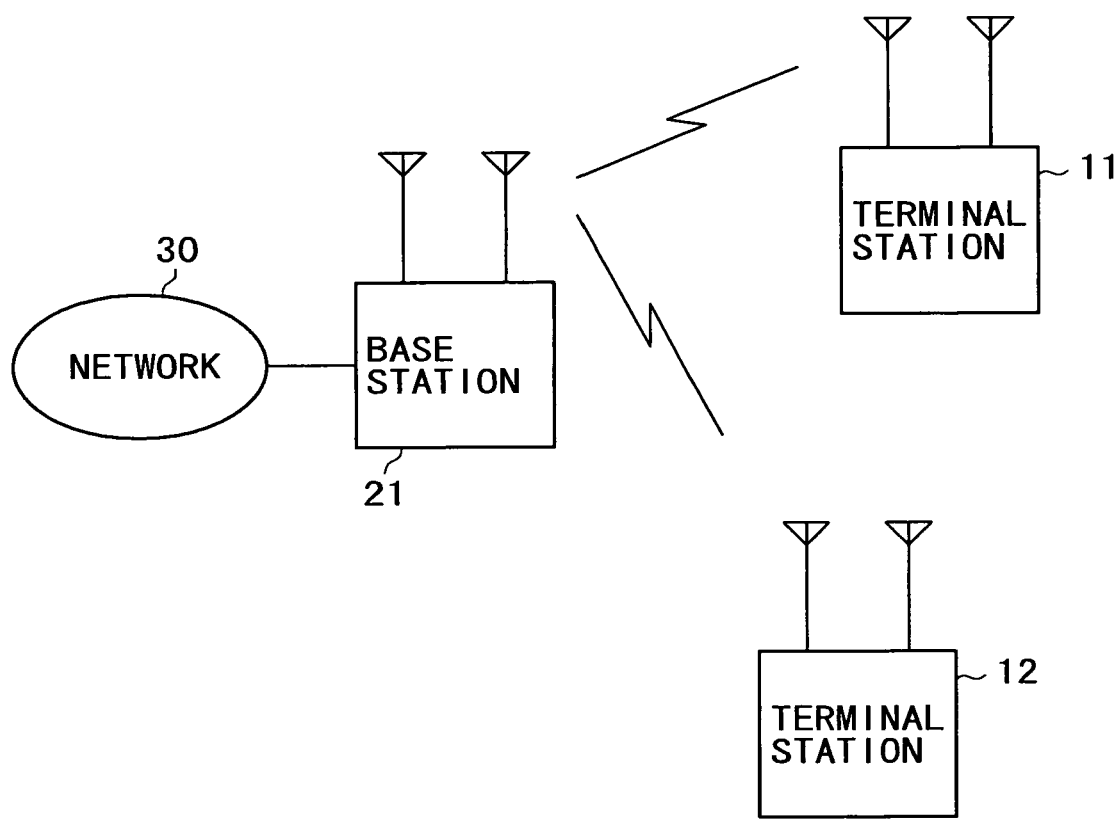
F I G. 17

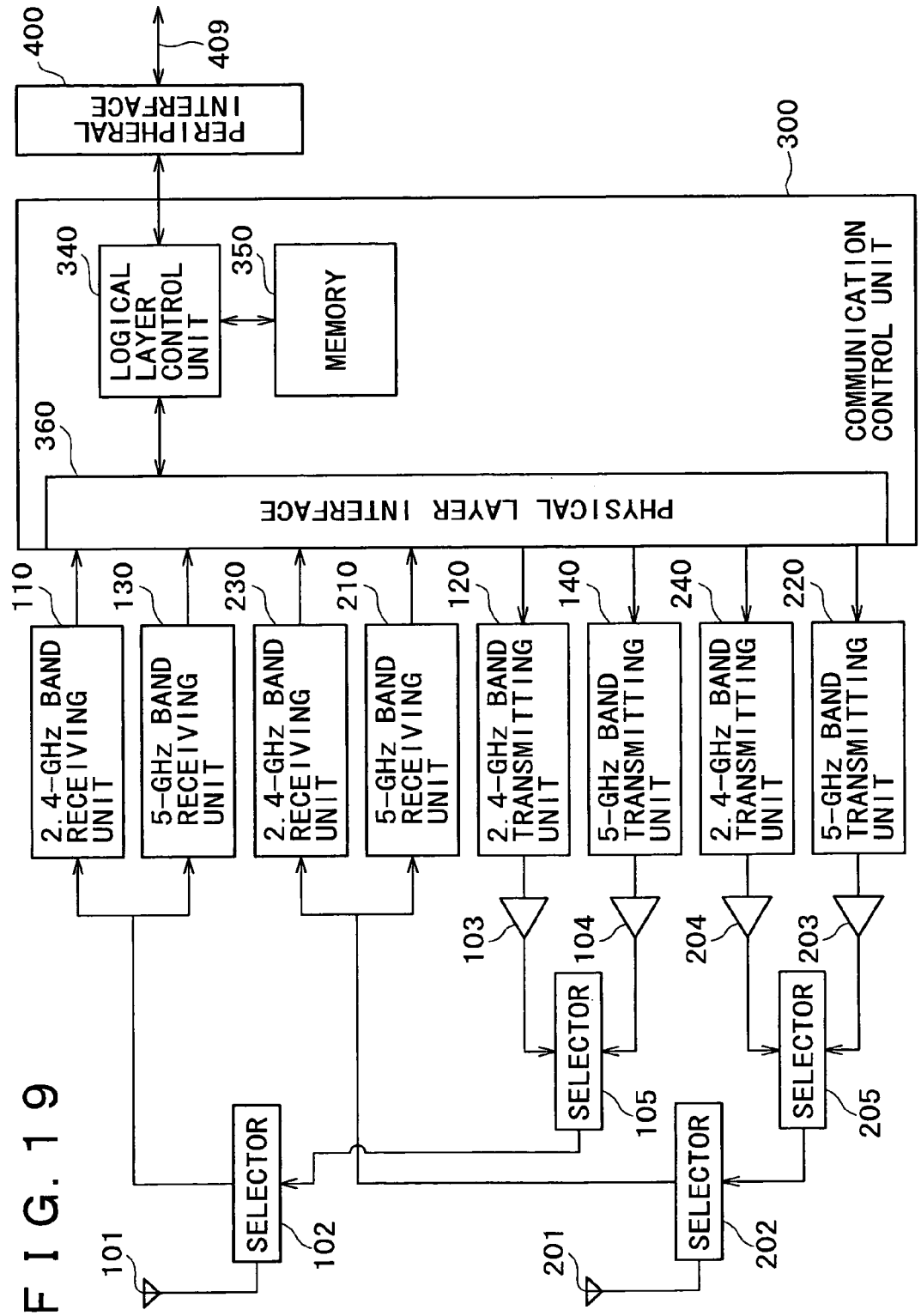

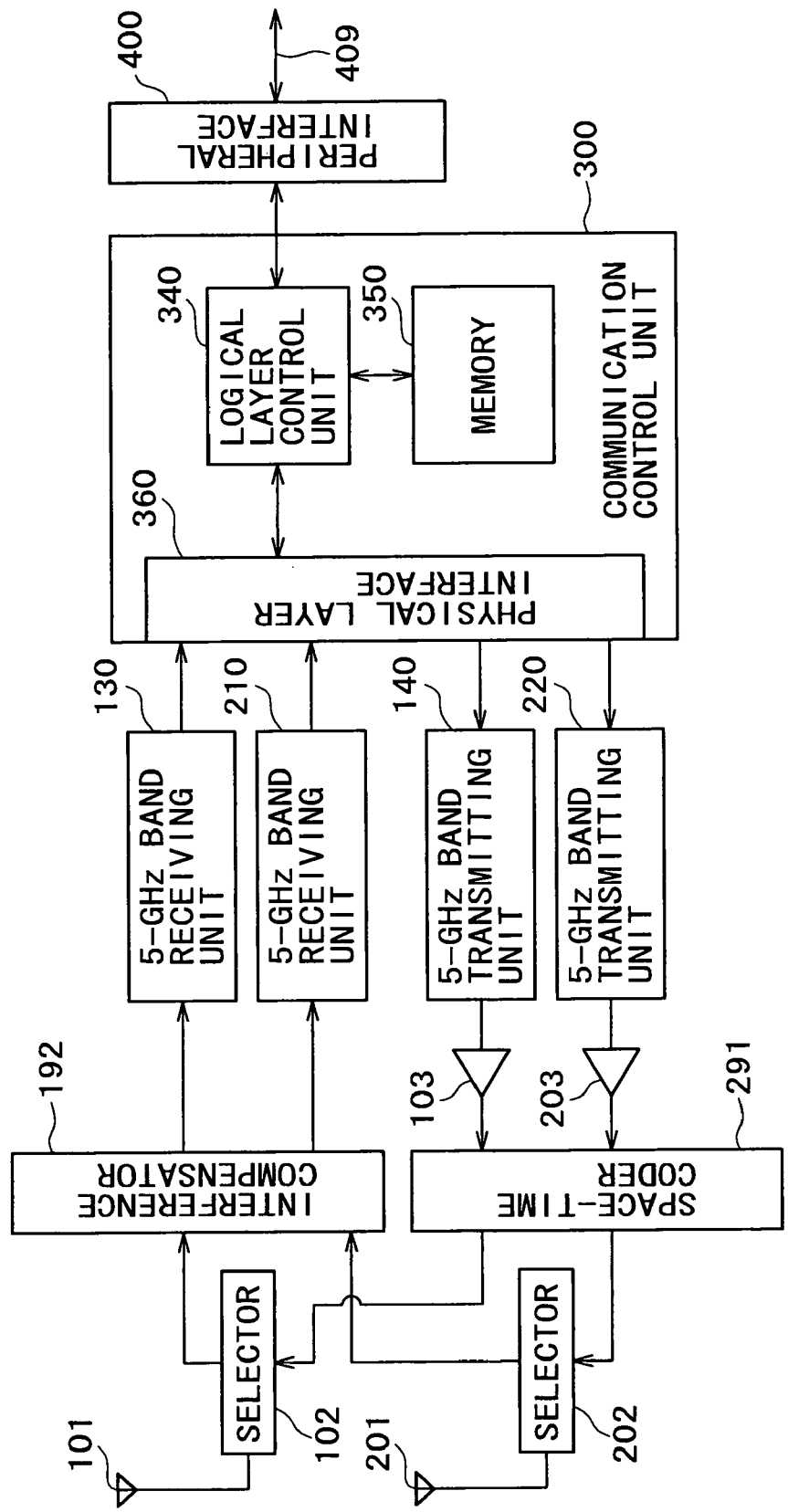

RADIO COMMUNICATION SYSTEM, TRANSMITTING APPARATUS, RECEIVING APPARATUS, PROCESSING METHOD AND PROGRAM

CROSS-REFERENCE TO RELATED APPLICATIONS

The present application claims priority from Japanese Application Nos. 2003-125198 filed Apr. 30, 2003 and 2003-355847 filed Oct. 16, 2003, the disclosures of which are hereby incorporated by reference herein.

BACKGROUND OF THE INVENTION

The present invention relates to a radio communication system for transmitting and receiving divided pieces of data in different transmission paths simultaneously, and particularly to a communication system, a transmitting apparatus, a receiving apparatus, a processing method in the apparatus, and a program for making a computer carry out the method.

A frequency diversity system is a method of transmitting an identical signal on a plurality of different carriers and selecting or synthesizing them on a receiving side to thereby improve characteristics. The frequency diversity system has an advantage in that since an identical signal is transmitted on a plurality of carriers, even when some of the carriers cannot be received, the signal can be received on another carrier. The frequency diversity system is widely used, particularly for an OFDM (Orthogonal Frequency Division Multiplexing) system, which has many carriers, because there is an extremely low possibility that none of the carriers can be received and a combination of carriers for transmitting an identical signal can be selected flexibly (see, for example, Japanese Patent Laid-Open No. 2000-201130 (FIG. 5) and Japanese Patent Laid-Open No. Hei 10-336159 (FIG. 1)).

Since the frequency diversity system described above transmits an identical signal on a plurality of carriers, even when a dip phenomenon occurs, in which the received radio field intensity is decreased by carriers of a direct wave and a delayed wave in opposite phase with each other on a receiving side due to multipath effects, for example, the signal can be received on one of the carriers.

However, since the identical signal is transmitted simultaneously, the frequency diversity system correspondingly lowers the transmission rate. With current technology, a maximum radio transmission speed in the IEEE802.11a standard by a working group of an IEEE (Institute of Electrical and Electronics Engineers) 802 standardization committee, for example, is 54 Mbps (bits/second), which cannot be said to be sufficient as compared with wire transmission speeds.

SUMMARY OF THE INVENTION

It is accordingly an object of the present invention to use different frequency bands simultaneously and realize efficient transmission by a form of transmission corresponding to a state of communication.

In order to solve the above problems, according to a first aspect of the present invention, there is provided a transmitting apparatus including a data dividing unit operable to divide data into pieces of data to be transmitted, a data outputting unit operable to add a distribution order to the divided pieces of data to form transmission data, and a transmitter operable to transmit the transmission data in different transmission paths simultaneously. Thus, the transmission data is transmitted in the different transmission paths simultaneously in a form that enables the transmission data to be merged on the receiving side according to the distribution order.

Preferably, the data dividing unit in the transmitting apparatus divides the data such that the transmission data is transmitted in substantially equal time lengths. Thus, the time lengths for the simultaneous transmission in the different transmission paths are equal to each other, thereby improving transmission efficiency.

Preferably, the transmitting apparatus further includes a response determining unit operable to determine a response to a previous data transmission in each of the different transmission paths. When the response indicates that a piece of the transmission data in the previous data transmission has failed to be received, the data dividing unit divides the data such that transmission data identical to the transmission data in the previous data transmission is retransmitted. Thus, control for retransmission is simplified.

Preferably, the transmitting apparatus further includes a response determining unit operable to determining a response to a previous data transmission in each of the different transmission paths. When the response indicates that a piece of the transmission data in the previous data transmission has failed to be received, the data dividing unit divides the data such that transmission data related to the transmission data in the previous data transmission is transmitted in the different transmission paths simultaneously. Thus, the data that has failed to be received is transmitted more reliably.

Preferably, the transmitter in the transmitting apparatus transmits the transmission data related to the transmission data in the previous data transmission in a modulation mode identical with a modulation mode of a transmission path in which reception of transmission data in the previous data transmission has succeeded. Thus, more reliable transmission is made in a modulation mode that has succeeded in receiving transmission data.

Preferably, the transmitting apparatus further includes a response determining unit operable to determine a response to a previous data transmission in each of the different transmission paths. When the responses to previous data transmissions indicate that the transmission data in the previous data transmissions has failed to be received at least a predetermined number of times in one of the transmission paths, the data dividing unit divides the data such that there are no subsequent transmissions in the one transmission path. Thus, a transmission path having a high frequency of reception failures is considered to be in a deteriorated state of communication, and transmission in the transmission path is stopped.

Preferably, the transmitting apparatus further includes a response determining unit operable to determine a response to a previous data transmission in each of the different transmission paths. When the responses to previous transmissions indicate that the transmission data in the previous data transmissions has failed to be received at least a predetermined number of consecutive times in one of the transmission paths, the data dividing unit divides the data such that there are no subsequent transmissions in the one transmission path. Thus, a transmission path in which reception has failed at least a predetermined number of consecutive times is considered to be in a deteriorated state of communication, and transmission in the transmission path is stopped.

Preferably, the transmitting apparatus further includes a response determining unit operable to determine a response to a previous data transmission in each of the different transmission paths. When the response determining unit determines that the responses to previous data transmissions have successfully been received at least a predetermined number of times in one of the transmission paths, the data dividing unit divides the data such that subsequent transmissions are made in the one transmission path. Thus, a transmission path having a high frequency of reception successes is considered to be improved in its state of communication, and transmission in the transmission path is resumed.

Preferably, the transmitting apparatus further includes a response determining unit operable to determine a response to a previous data transmission in each of the different transmission paths. When the response determining unit determines that the responses to the previous data transmissions have successfully been received at least a predetermined number of consecutive times in one of the transmission paths, the data dividing unit divides the data such that subsequent transmissions are made in the one transmission path. Thus, a transmission path in which reception has succeeded at least a predetermined number of consecutive times is considered to be improved in its state of communication, and transmission in the transmission path is resumed.

Preferably, the transmitting apparatus further includes a response determining unit operable to determine a response to a previous data transmission in each of the different transmission paths. When the responses to previous data transmissions indicate that the transmission data in the previous data transmissions has failed to be received at least a predetermined number of times in one of the transmission paths, the data dividing unit divides the data such that subsequent transmissions in the one transmission path are made in a modulation mode having a higher noise resistance. Thus, a transmission path having a high frequency of reception failures is considered to be in a deteriorated state of communication, and transmission in the transmission path is made in a modulation mode having a higher noise resistance.

Preferably, the transmitting apparatus further includes a response determining unit operable to determine a response to a previous data transmission in each of the different transmission paths. When the responses to previous data transmissions indicate that the transmission data in the previous data transmissions has failed to be received at least a predetermined number of consecutive times in one of the transmission paths, the data dividing unit divides the data such that subsequent transmissions in the one transmission path are made in a modulation mode having a higher noise resistance. Thus, a transmission path in which reception has failed at least a predetermined number of consecutive times is considered to be in a deteriorated state of communication, and transmission in the transmission path is made in a modulation mode having a higher noise resistance.

Preferably, the transmitting apparatus further includes a response determining unit for determining a response to a previous data transmission in each of the different transmission paths. When the response determining unit determines that the responses to previous data transmissions have successfully been received at least a predetermined number of times in one of the transmission paths, the data dividing unit divides the data such that subsequent transmissions in the one transmission path are made in a modulation mode having a lower noise resistance. Thus, a transmission path having a high frequency of reception successes is considered to be improved in its state of communication, and transmission in the transmission path is made in a modulation mode having lower noise resistance.

Preferably, the transmitting apparatus further includes a response determining unit operable to determine a response to a previous data transmission in each of the different transmission paths. When the response determining unit determines that the responses to previous data transmissions have successfully been received at least a predetermined number of consecutive times in one of the transmission paths, the data dividing unit divides the data such that subsequent transmissions in the one transmission path are made in a modulation mode having a lower noise resistance. Thus, a transmission path in which reception has succeeded at least a predetermined number of consecutive times is considered to be improved in its state of communication, and transmission in the transmission path is made in a modulation mode having a lower noise resistance.

Preferably, the transmitting apparatus further includes a carrier sense unit operable to report a state of availability of each of the transmission paths prior to data transmission. The transmitter does not transmit the transmission data in a selected transmission path reported to be unavailable by the carrier sense unit even when the selected transmission path becomes available after the data transmission is started in transmission paths other than the selected transmission path. Thus, control for transmission is simplified.

Preferably, the different transmission paths in the transmitting apparatus use frequency bands different from each other. Thus, transmission data is transmitted in different frequency bands, for example a 2.4-GHz band and a 5-GHz band, simultaneously.

Preferably, the different transmission paths in the transmitting apparatus use the same frequency band but different channels from each other in the frequency band. Thus, transmission data is transmitted in different channels simultaneously, even in the same frequency band.

Preferably, the different transmission paths in the transmitting apparatus use the same channel but propagation paths having different transfer functions from each other in the channel. Thus, transmission data is transmitted in propagation paths having different transfer functions simultaneously, even in the same channel.

According to a second aspect of the present invention, there is provided a receiving apparatus including a data receiving unit operable to receive transmitted data in different transmission paths simultaneously, the transmitted data including divided pieces of data to which a distribution order has been added, and a data merging unit operable to merge the received data according to the distribution order. Thus, data divided on the transmitting side is received in different transmission paths simultaneously and merged.

Preferably, the receiving apparatus further includes a data determining unit operable to determine a state of data reception in each of the different transmission paths, and a response outputting unit operable to output an identical response to each of the different transmission paths, the response including the state of data reception in each of the different transmission paths. Thus, even when the state of communication in one of the transmission paths has deteriorated, a response is returned to a data transmitter more reliably.

Preferably, the different transmission paths in the receiving apparatus use frequency bands different from each other. Thus, data divided on the transmitting side is received in different frequency bands simultaneously.

Preferably, the different transmission paths in the receiving apparatus use the same frequency band but different channels from each other in the frequency band. Thus, data is received in different channels simultaneously, even in the same frequency band.

Preferably, the different transmission paths in the receiving apparatus use the same channel but propagation paths having different transfer functions from each other in the channel. Thus, data is received in propagation paths having different transfer functions simultaneously, even in the same channel.

According to a third aspect of the present invention, there is provided a communication system including a transmitting apparatus and a receiving apparatus for performing radio communication. The transmitting apparatus includes a data dividing unit operable to divide data into pieces of data to be transmitted, a data outputting unit operable to add a distribution order to the divided pieces of data to form transmission data, and a transmitter operable to transmit the transmission data in different transmission paths simultaneously. The receiving apparatus includes a data receiving unit operable to receive the transmission data in the different transmission paths simultaneously, a data merging unit operable to merge the received transmission data according to the distribution order, a data determining unit operable to determine a state of data reception in each of the different transmission paths, and a response outputting unit operable to output an identical response to the transmitting apparatus in each of the different transmission paths, the response including the state of data reception in each of the different transmission paths. Thus, data divided on the transmitting side is provided with a distribution order and transmitted in different transmission paths simultaneously, and the data is merged according to the distribution order on the receiving side.

Preferably, the different transmission paths in the communication system use frequency bands different from each other. Thus, data divided on the transmitting side is transmitted in different frequency bands simultaneously, and is received in the different frequency bands and then merged on the receiving side.

Preferably, the different transmission paths in the communication system use the same frequency band but different channels from each other in the frequency band. Thus, data is transmitted and received in different channels simultaneously, even in the same frequency band.

Preferably, the different transmission paths in the communication system use the same channel but propagation paths having different transfer functions from each other in the channel. Thus, data is transmitted and received in propagation paths having different transfer functions simultaneously, even in the same channel.

According to a fourth aspect of the present invention, there is provided a processing method including dividing data into pieces of data to be transmitted, adding a distribution order to the divided pieces of data to form transmission data, and transmitting the transmission data in different transmission paths simultaneously. Thus, the transmission data is transmitted in the different transmission paths simultaneously in a form that enables the transmission data to be merged according to the distribution order on the receiving side.

According to a fifth aspect of the present invention, there is provided a processing method including dividing data into pieces of data to be transmitted, adding a distribution order to the divided pieces of data to form transmission data, transmitting the transmission data in different transmission paths simultaneously, and when the transmitted transmission data has failed to be received in one of the transmission paths, dividing the data such that transmission data identical to the transmitted transmission data is retransmitted. Thus, control for retransmission is simplified.

According to a sixth aspect of the present invention, there is provided a processing method including dividing data into pieces of data to be transmitted, adding a distribution order to the divided pieces of data to form transmission data, transmitting the transmission data in different transmission paths simultaneously, and when the transmitted transmission data has failed to be received in one of the transmission paths, dividing the data such that transmission data related to the transmitted transmission data is transmitted in the different transmission paths simultaneously. Thus, the data that has failed to be received is transmitted more reliably.

According to a seventh aspect of the present invention, there is provided a processing method including receiving transmitted data in different transmission paths simultaneously, the transmitted data including divided pieces of data to which a distribution order has been added, merging the received data according to the distribution order, determining a state of data reception in each of the different transmission paths, and outputting an identical response to each of the different transmission paths, the response including the state of data reception in each of the different transmission paths. Thus, even when the state of communication in one of the transmission paths has deteriorated, a response is returned to a data transmitter more reliably.

According to an eighth aspect of the present invention, there is provided a recording medium recorded with a program for causing a computer to execute a method of data communication, the method including dividing data into pieces of data to be transmitted, adding a distribution order to the divided pieces of data to form transmission data, and transmitting the transmission data in different transmission paths simultaneously. Thus, the transmission data is transmitted in the different transmission paths simultaneously in a form that enables the transmission data to be merged on the receiving side according to the distribution order.

According to a ninth aspect of the present invention, there is provided a recording medium recorded with a program for causing a computer to execute a method of data communication, the method including dividing data into pieces of data to be transmitted, adding a distribution order to the divided pieces of data to form transmission data, transmitting the transmission data in different transmission paths simultaneously, and when the transmitted transmission data has failed to be received in one of the transmission paths, dividing the data such that transmission data identical to the transmitted transmission data is retransmitted. Thus, control for retransmission is simplified.

According to a tenth aspect of the present invention, there is provided a recording medium recorded with a program for causing a computer to execute a method of data communication, the method including dividing data into pieces of data to be transmitted, adding a distribution order to the divided pieces of data to form transmission data, transmitting the transmission data in different transmission paths simultaneously, and when the transmitted transmission data has failed to be received in one of the transmission paths, dividing the data such that transmission data related to the transmitted transmission data is transmitted in the different transmission paths simultaneously. Thus, the data that has failed to be received is transmitted more reliably.

According to an eleventh aspect of the present invention, there is provided a recording medium recorded with a program for causing a computer to execute a method of data communication, the method including receiving transmitted data in different transmission paths simultaneously, the transmitted data including divided pieces of data to which a distribution order has been added, merging the received data according to the distribution order, determining a state of data reception in each of the different transmission paths, and outputting an identical response to each of the different transmission paths, the response including the state of data reception in each of the different transmission paths. Thus, even when the state of communication in one of the transmission paths has deteriorated, a response is returned to a data transmitter more reliably.

According to the present invention, it is possible to achieve excellent effects of using different transmission paths simultaneously and realizing efficient transmission by a form of transmission corresponding to a state of communication.

The items of the embodiment of the present invention corresponding to the items in the various aspects thereof are as follows.

The data dividing unit corresponds to the data dividing part 331, for example. The data outputting unit corresponds to the data outputting part A 315 and the data outputting part B 325, for example. The transmitter corresponds to the transmitting units 120 and 220, for example.

The response determining unit corresponds to the response determining part A 312 and the response determining part B 322, for example.

The data receiving unit corresponds to the receiving units 110 and 210, for example. The data merging unit corresponds to the data merging part 371, for example.

The data determining unit corresponds to the data determining part A 351 and the data determining part B 361, for example. The response outputting unit corresponds to the response outputting part A 352 and the response outputting part B 362, for example.

The step of dividing data into pieces of data to be transmitted corresponds to the processing of the data dividing part 331, for example. The step of adding a distribution order to the divided pieces of data to form transmission data corresponds to the processing of the data outputting part A 315 and the data outputting part B 325, for example. The step of transmitting the transmission data in different transmission paths simultaneously corresponds to the processing of the transmitting units 120 and 220, for example.

The step of receiving transmitted data in different transmission paths simultaneously, the transmitted data including divided pieces of data to which a distribution order has been added, corresponds to the processing of the receiving units 110 and 210, for example. The step of merging the received data according to the distribution order corresponds to the processing of the data merging part 371, for example. The step of determining a state of data reception in each of the different transmission paths corresponds to the processing of the data determining part A 351 and the data determining part B 361, for example. The step of outputting an identical response to each of the different transmission paths, the response including the state of data reception in each of the different transmission paths corresponds to the processing of the response outputting part A 352 and the response outputting part B 362, for example.

It is to be noted that the processing steps described in the embodiment of the present invention may be construed as a method including a series of steps, or may be construed as a recording medium recorded with a program for causing a computer to perform the series of steps.

As is clear from the above description, the present invention provides the effects of using different transmission paths simultaneously and realizing efficient transmission by a form of transmission corresponding to a state of communication.

BRIEF DESCRIPTION OF THE DRAWINGS

FIG. 6 is a diagram showing a functional configuration of a data reception control function of the communication control unit in the embodiment of the present invention;

FIG. 17 is a diagram showing an example of the configuration of a radio communication system in the embodiment of the present invention.

FIG. 19 is a diagram showing a second modified configuration of the terminal station or the base station in the embodiment of the present invention.

FIG. 20 is a diagram showing a third modified configuration of the terminal station or the base station in the embodiment of the present invention.

DETAILED DESCRIPTION

A preferred embodiment of the present invention will next be described in detail with reference to the drawings.

Figure 1:
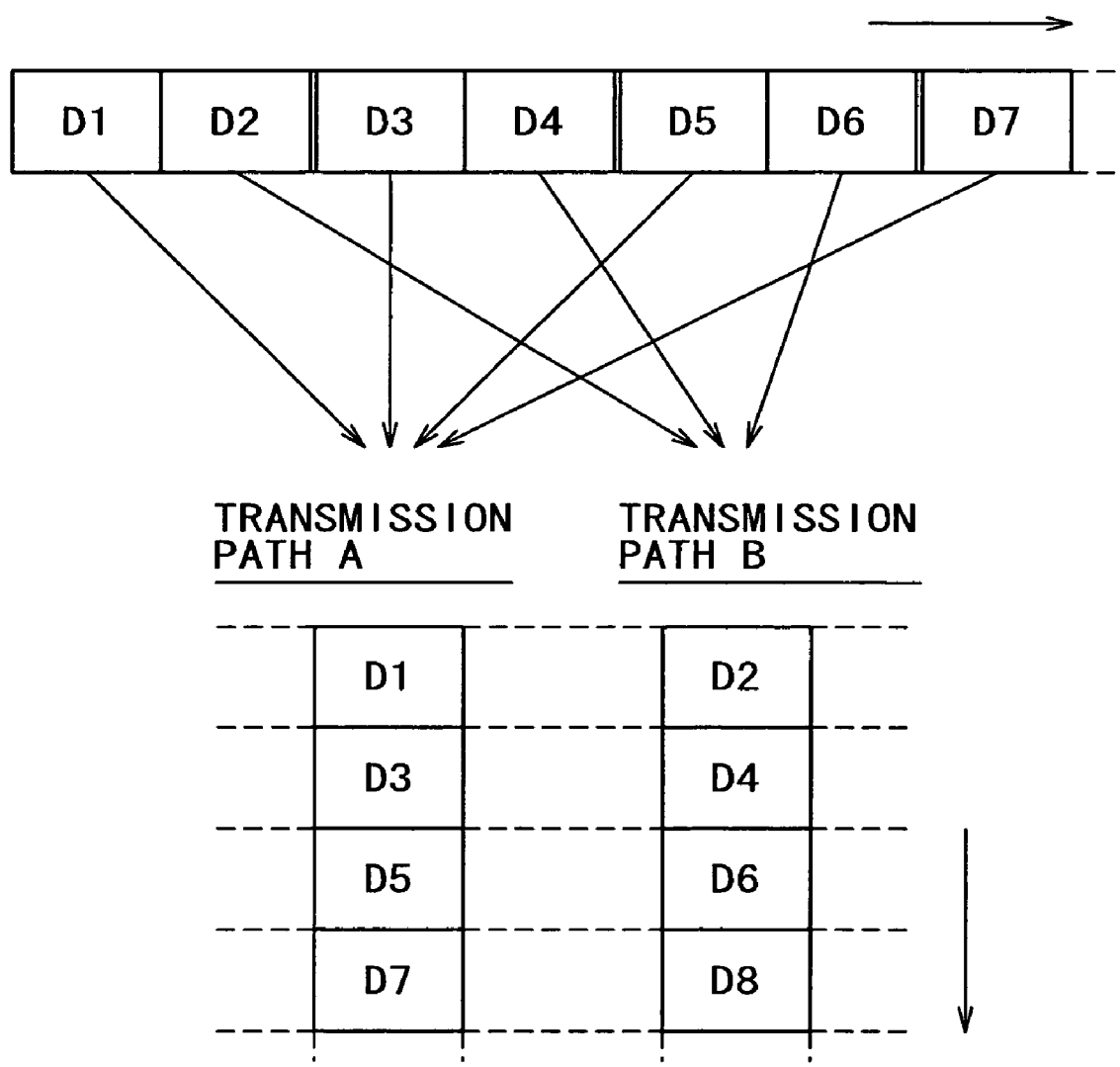
FIG. 1 is a diagram showing an outline of data division in an embodiment of the present invention.

FIG. 1 is a diagram showing an outline of data division according to the present invention. Data to be transmitted in a transmitting apparatus is divided sequentially from a start thereof into D1 and D2, D3 and D4, . . . , for example. The divided data is transmitted in a state of being divided in a plurality of different transmission paths such that, for example, the data D1 is transmitted in a transmission path A and the data D2 is transmitted in a transmission path B. While FIG. 1 shows an example of dividing data in two transmission paths, that is, transmission paths A and B, the number of transmission paths can be set as appropriate.

The divided pieces of data D1 and D2 are simultaneously transmitted by the different transmission paths A and B. Modulation modes in the respective transmission paths do not need to coincide with each other, whereas it is desirable to set the number of bits in the data division such that the time lengths required for transmission substantially coincide with each other. After the pieces of data D1 and D2 are transmitted, the pieces of data D1 and D2 are simultaneously transmitted by transmission paths A and B. As long as the states of communication in the respective transmission paths permit, such simultaneous transmission by transmission paths A and B is performed sequentially.

The specific frequencies of transmission paths A and B are not particularly limited. However, assuming the use of transmission paths in a wireless LAN (Local Area Network), using a 2.4-GHz band and a 5-GHz band, for example, may be considered. Use of the 2.4-GHz band is specified in the IEEE802.11 standard. In the IEEE802.11a standard as an extension of the IEEE802.11 standard, the 5-GHz band is used, and an OFDM system is used as a modulation system. It is therefore possible to realize a high transmission rate by using the OFDM system of the IEEE802.11a standard in the 5-GHz band and the 2.4-GHz band simultaneously.

On the other hand, the IEEE802.11b and IEEE802.11g standards as other extension standards use a DSSS (Direct Sequence Spread Spectrum) system in the 2.4-GHz band. Thus, by using the OFDM system in the 5-GHz band and the DSSS system in the 2.4-GHz band, it is possible to realize a high transmission rate while maintaining compatibility between the IEEE802.11a, IEEE802.11b, and IEEE802.11g standards.

In the present invention, when communication is performed by different transmission paths simultaneously, different frequency bands may be used, different channels of an identical frequency band may be used, or propagation paths having different transfer functions in an identical channel may be used. In the present embodiment, however, the configuration and operation thereof will be described supposing that simultaneous transmission and reception is performed using different frequency bands, for example.

Figure 2:
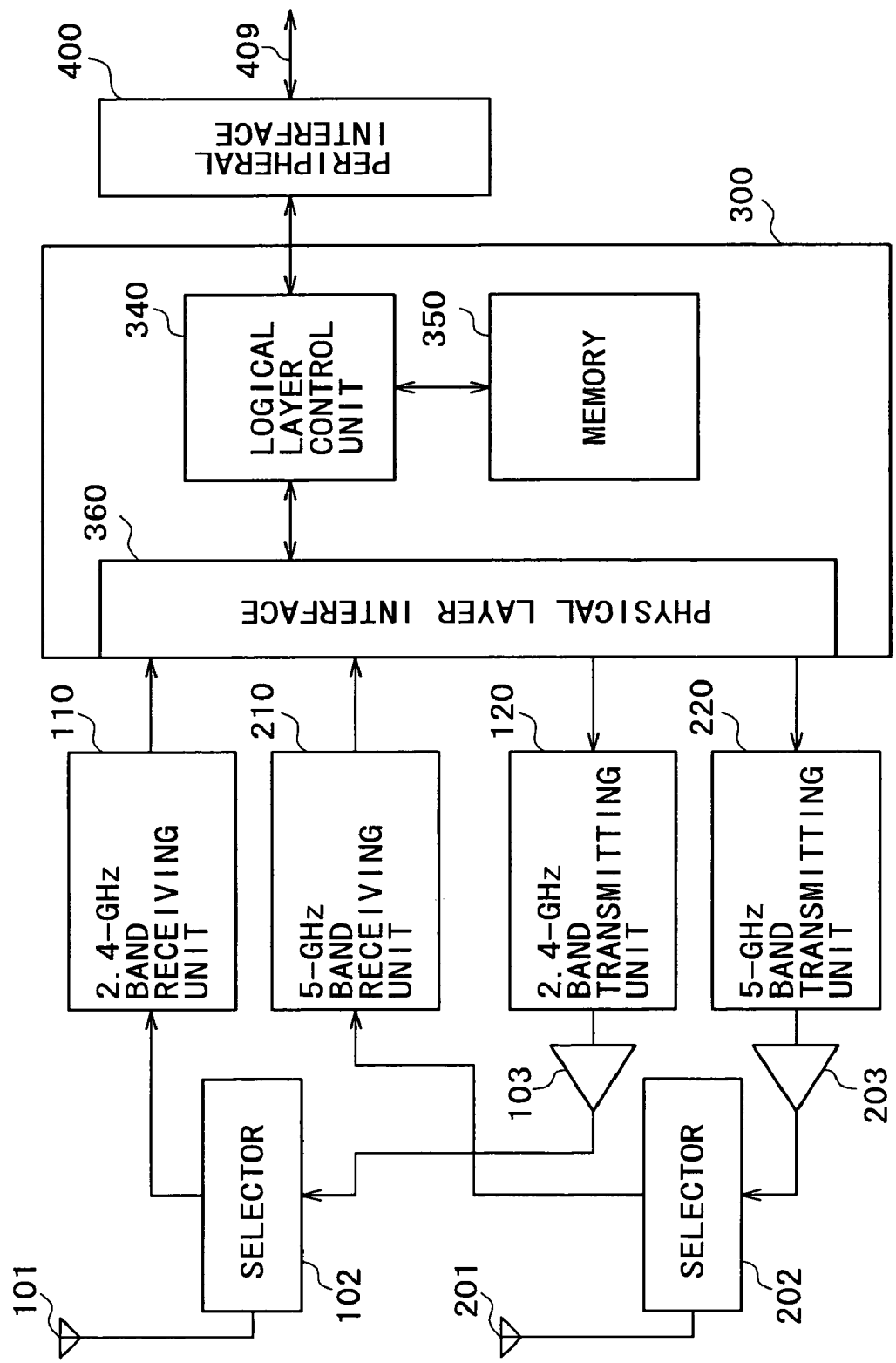
FIG. 2 is a diagram showing a configuration of a terminal station or a base station in the embodiment of the present invention.

FIG. 2 is a diagram showing a configuration of a terminal station or a base station according to the present invention. The terminal station or the base station functions as a transmitting apparatus or a receiving apparatus for use in the 2.4-GHz band and the 5-GHz band. Specifically, the terminal station or the base station has an antenna 101, a selector 102, a power amplifier 103, and a receiving unit 110 and a transmitting unit 120, both for use in the 2.4-GHz band, and has an antenna 201, a selector 202, a power amplifier 203, and a receiving unit 210 and a transmitting unit 220, both for use in the 5-GHz band. Therefore, the terminal station or the base station can transmit and receive in both the 2.4-GHz band and the 5-GHz band simultaneously.

The antennas 101 and 201 are used to transmit and receive high-frequency signals in the 2.4-GHz band and the 5-GHz band, respectively. The selectors 102 and 202 select the receiving units 110 and 210 and the transmitting units 120 and 220 to be connected to the antennas 101 and 201 in the 2.4-GHz band and the 5-GHz band, respectively. The receiving units 110 and 210 in the 2.4-GHz band and the 5-GHz band receive, demodulate, and decode high-frequency signals in the 2.4-GHz band and the 5-GHz band, respectively. The transmitting units 120 and 220 in the 2.4-GHz band and the 5-GHz band encode and modulate high-frequency signals in the 2.4-GHz band and the 5-GHz band, respectively, for transmission. Output parts of the transmitting units 120 and 220 in the 2.4-GHz band and the 5-GHz band are connected with the power amplifiers 103 and 203, respectively. The power amplifiers 103 and 203 amplify transmission signals.

The terminal station or the base station further includes a communication control unit 300. The communication control unit 300 performs processing mainly in a logical layer. The communication control unit 300 includes a logical layer control unit 340, a memory 350, and a physical layer interface 360. The logical layer control unit 340 processes frames in a MAC (Media Access Control) sublayer in a data link layer as the logical layer, for example. The memory 350 retains work data and the like necessary for processing by the logical layer control unit 340. The physical layer interface 360 is an interface for data exchange with a physical layer realized by the receiving units 110 and 210 and the transmitting units 120 and 220 in the 2.4-GHz band and the 5-GHz band.

The terminal station or the base station further includes a peripheral interface 400. In the case of the terminal station, a host interface is used as the peripheral interface 400, and a host apparatus such as a computer or the like is connected to a port 409 of the host interface. In the case of the base station, on the other hand, a network interface is used as the peripheral interface 400, and a modem for using the Internet or the like is connected to a port 409 of the network interface.

Figure 3:
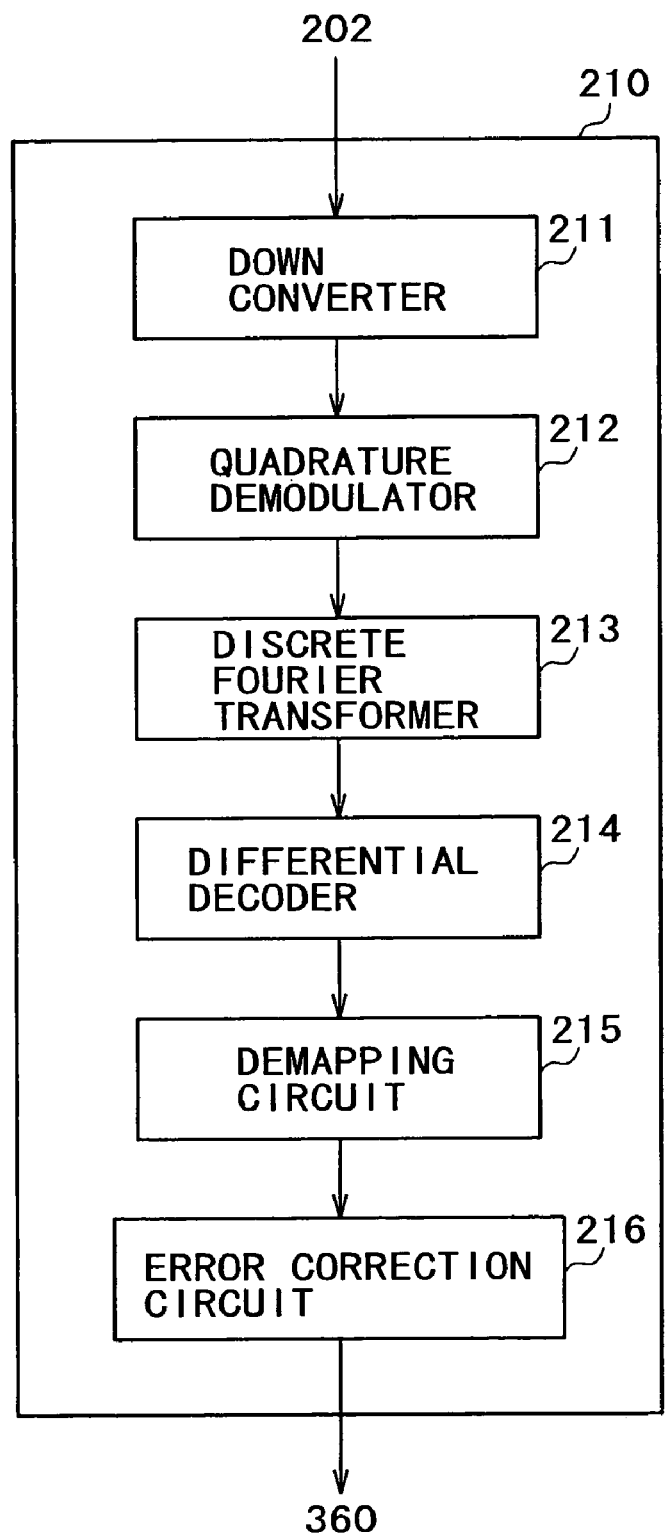
FIG. 3 is a diagram showing a configuration of a receiving unit of the terminal station or the base station in the embodiment of the present invention.

FIG. 3 is a diagram showing a configuration of the receiving unit 210 of the terminal station or the base station according to the present invention. The receiving unit 210 converts a high-frequency signal in the 5-GHz band received by the antenna 201 into an intermediate signal, and subjects the intermediate signal to demodulation and decoding. Supposing the OFDM system, the receiving unit 210 includes a down converter 211, a quadrature demodulator 212, a discrete Fourier transformer 213, a differential decoder 214, a demapping circuit 215, and an error correction circuit 216.

The down converter 211 converts a high-frequency signal in the 5-GHz band into an intermediate signal in a predetermined intermediate frequency band. The quadrature demodulator 212 subjects the intermediate signal converted by the down converter 211 to quadrature detection, and thereby extracts a baseband signal comprising an in-phase signal (I signal) in phase with the intermediate signal and a quadrature phase signal (Q signal) as a quadrature phase component of the intermediate signal. The discrete Fourier transformer 213 subjects the baseband signal extracted by the quadrature demodulator 212 to Fourier transform in effective symbol lengths excluding guard intervals, and demodulates complex data for each subcarrier.

The differential decoder 214 subjects the complex data demodulated by the discrete Fourier transformer 213 to differential decoding, and is used in a PSK system, for example. The demapping circuit 215 demaps the complex data decoded by the differential decoder 214, and thereby extracts a data symbol. The error correction circuit 216 corrects the data by Viterbi decoding or the like. The data thus obtained is output to the physical layer interface 360 of the communication control unit 300.

While a description has been made above of the 5-GHz band receiving unit 210, the 2.4-GHz band receiving unit 110 is similarly configured to convert a high-frequency signal in the 2.4-GHz band received by the antenna 101 into an intermediate signal and subject the intermediate signal to demodulation and decoding.

Figure 4:
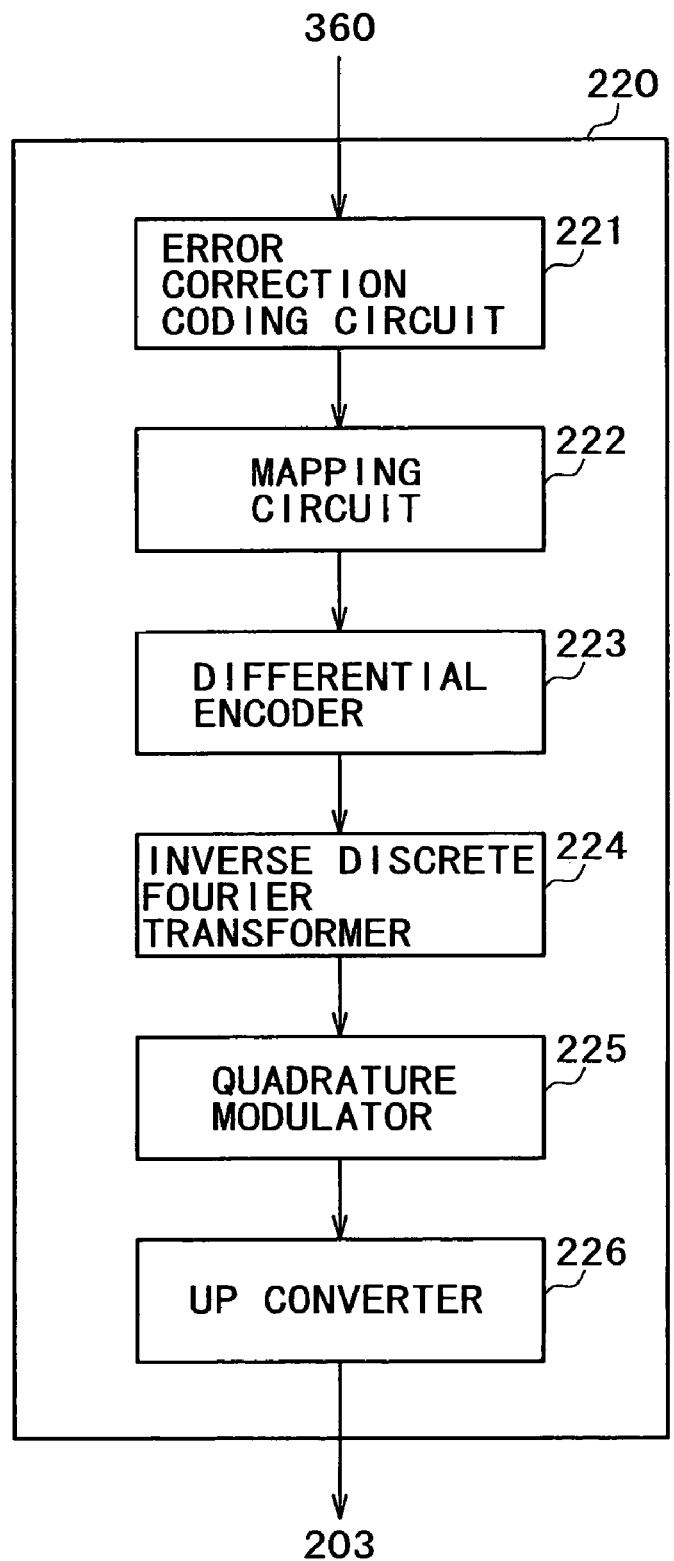
FIG. 4 is a diagram showing a configuration of a transmitting unit of the terminal station or the base station in the embodiment of the present invention.

FIG. 4 is a diagram showing a configuration of the transmitting unit 220 of the terminal station or the base station according to the present invention. The transmitting unit 220 encodes and modulates data from the physical layer interface 360, converts the data into a high-frequency signal, and then outputs the high-frequency signal to the antenna 201. Supposing the OFDM system, the transmitting unit 220 includes an error correction coding circuit 221, a mapping circuit 222, a differential encoder 223, an inverse discrete Fourier transformer 224, a quadrature modulator 225, and an up converter 226.

The error correction coding circuit 221 performs encoding by convolutional code or the like according to the bit rate. The mapping circuit 222 maps data resulting from error correction coding by the error correction coding circuit 221 into a complex data symbol. The differential encoder 223 subjects the complex data symbol mapped by the mapping circuit 222 to differential encoding, and assigns complex data to each subcarrier.

The inverse discrete Fourier transformer 224 modulates the complex data differential-encoded by the differential encoder 223 by inverse Fourier transform, and then outputs a baseband signal (an I signal and a Q signal). The quadrature modulator 225 subjects the baseband signal to quadrature modulation, and thereby generates an intermediate signal in a predetermined intermediate frequency band. The up converter 226 converts the intermediate signal generated by the quadrature modulator 225 into a high-frequency signal in the 5-GHz band, and then outputs the high-frequency signal to the antenna 201.

While a description has been made above of the 5-GHz band transmitting unit 220, the 2.4-GHz band transmitting unit 120 is similarly configured to encode and modulate data from the physical layer interface 360, convert the data into a high-frequency signal in the 2.4-GHz band, and then output the high-frequency signal to the antenna 101.

Figure 5:
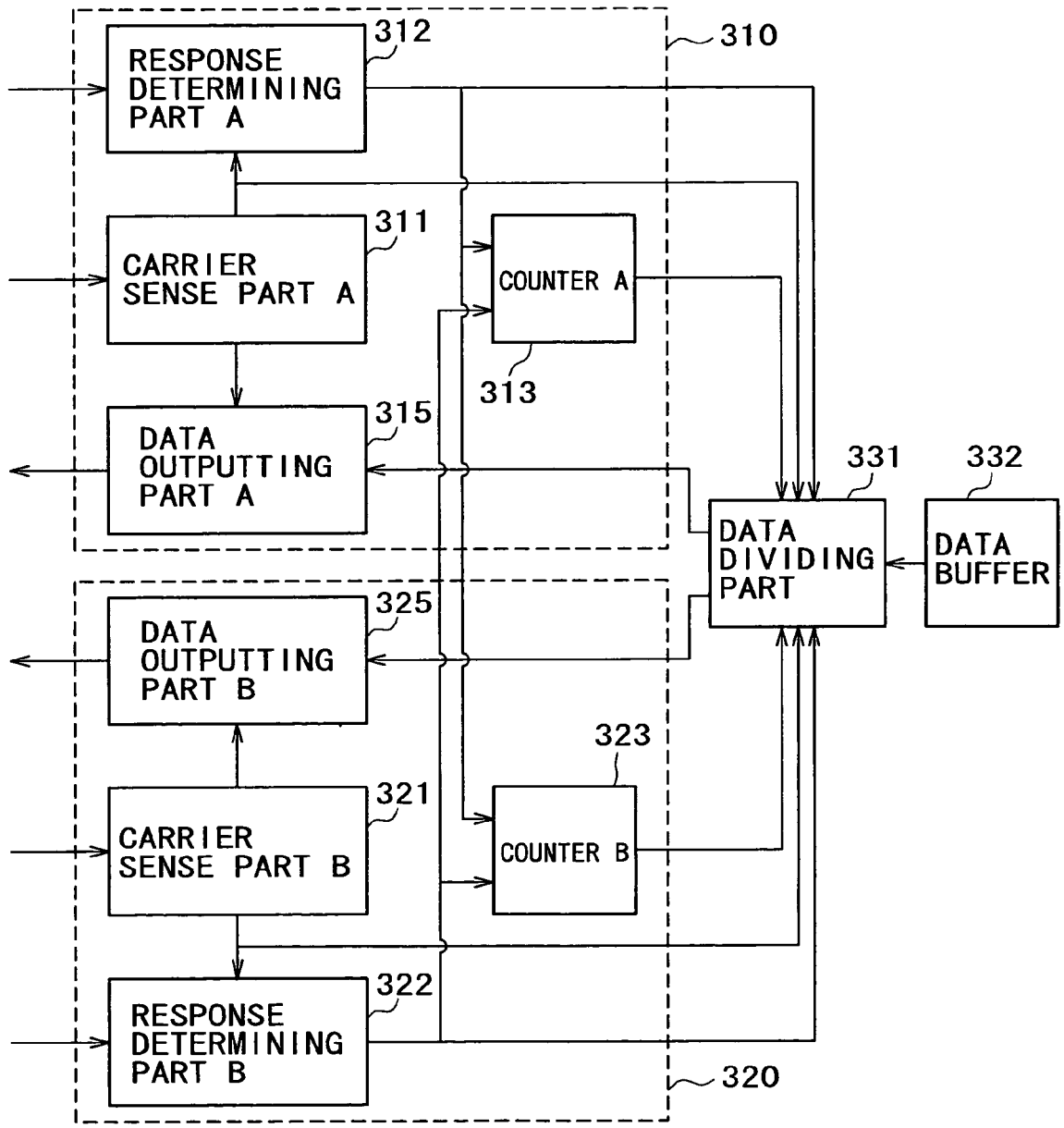
FIG. 5 is a diagram showing a functional configuration of a data transmission control function of a communication control unit in the embodiment of the present invention.

FIG. 5 is a diagram showing a functional configuration of the data transmission control function of the communication control unit 300 according to the present invention. The data transmission control function includes a data dividing part 331 for dividing data retained in a data buffer 332; a division control part A 310 for controlling the division of data in a frequency band A (for example, the 2.4-GHz band); and a division control part B 320 for controlling the division of data in a frequency band B (for example, the 5-GHz band).

The division control part A 310 comprises a carrier sense part A 311, a response determining part A 312, a counter A 313, and a data outputting part A 315. The carrier sense part A 311 reports the state of availability in frequency band A to the data outputting part A 315, the response determining part A 312, and the data divider 331. When the carrier sense part A 311 reports that frequency band A is not available, the data outputting part A 315 does not output data. As a result, when frequency band B is available, data transmission is performed in only frequency band B. In that case, it is desirable to effect control so that once data transmission is started in frequency band B, data transfer in frequency band A is not performed at that time even when it is thereafter determined that frequency band A is available. This is to avoid complexity of control due to the difference in timing of data transmission in each frequency band. When the carrier sense part A 311 reports that frequency band A is not available, the response determining part A 312 and the data dividing part 331 can effect control for a next data transmission without waiting for an actual response.

The response determining part A 312 determines a response to a previous data transmission in frequency band A, and then supplies a result of the determination to the data dividing part 331, the counter A 313, and a counter B 323. The data dividing part 331 sequentially distributes data from the data buffer 332 to the data outputting part A 315 and a data outputting part B 325 as later described. However, as described next, data transmission in frequency band A is stopped (that is, a transition is made to a transmission stop mode), or resumed (that is, a transition is made to a transmission mode) according to the state of the counter A 313.

The counter A 313 comprises a success counter A and a failure counter A. The success counter A counts the number of consecutive times that a response to data transmission in frequency band A is successfully received. On the other hand, the failure counter A counts the number of consecutive times that data transmitted in frequency band A fails to be received. When the failure counter A indicates a value of a predetermined number of times or more, the data dividing part 331 divides data to be transmitted so as not to make subsequent data transmission in frequency band A. That is, a transition is made from the transmission mode to the transmission stop mode for frequency band A. On the other hand, when the success counter A indicates a value of a predetermined number of times or more in the transmission stop mode, the data dividing part 331 divides data to be transmitted so as to make subsequent data transmission in frequency band A. That is, a transition is made from the transmission stop mode to the transmission mode for frequency band A.

The counter A 313 is supplied with the result of the response determination from both the response determining part A 312 and a response determining part B 322. Even in a case where the state of communication in one of the frequency bands deteriorates to render response reception impossible, when a response can be received in at least one of the frequency bands, the states of data reception in all the frequency bands can be recognized.

While a description has been made above of the division control part A 310, the division control part B 320 is similarly configured to control division of data in frequency band B. Also, the data dividing part 331 independently controls the stopping and resumption of data transmission in frequency band B according to the state of the counter B 323 without depending on the state of frequency band A.

FIG. 6 is a diagram showing a functional configuration of the data reception control function of the communication control unit 300 according to the present invention. The data reception control function includes a data merging part 371 for merging data received in each frequency band and making a data buffer 372 retain the merged data; a merging control part A 350 for controlling the merging of data in frequency band A (for example, the 2.4-GHz band); and a merging control part B 360 for controlling the merging of data in frequency band B (for example, the 5-GHz band).

The merging control part A 350 comprises a data determining part A 351 and a response outputting part A 352. The merging control part B 360 comprises a data determining part B 361 and a response outputting part B 362. The data determining part A 351 determines the state of data reception in frequency band A, and then supplies the result of the determination to the data merging part 371 and the response outputting parts A 352 and B 362. The data determining part B 361 determines the state of data reception in frequency band B, and then supplies the result of the determination to the data merging part 371 and the response outputting parts A 352 and B 362.

The response outputting part A 352 combines the result of the determination of the state of data reception in frequency band A received from the data determining part A 351 with the result of the determination of the state of data reception in frequency band B received from the data determining part B 361, and then outputs the combined result as a response in frequency band A. The response outputting part B 362 combines the result of the determination of the state of data reception in frequency band A received from the data determining part A 351 with the result of the determination of the state of data reception in frequency band B received from the data determining part B 361, and then outputs the combined result as a response in frequency band B. Thus, a response in each frequency band includes the results of the determination of the states of data reception in all frequency bands.

Figure 7:
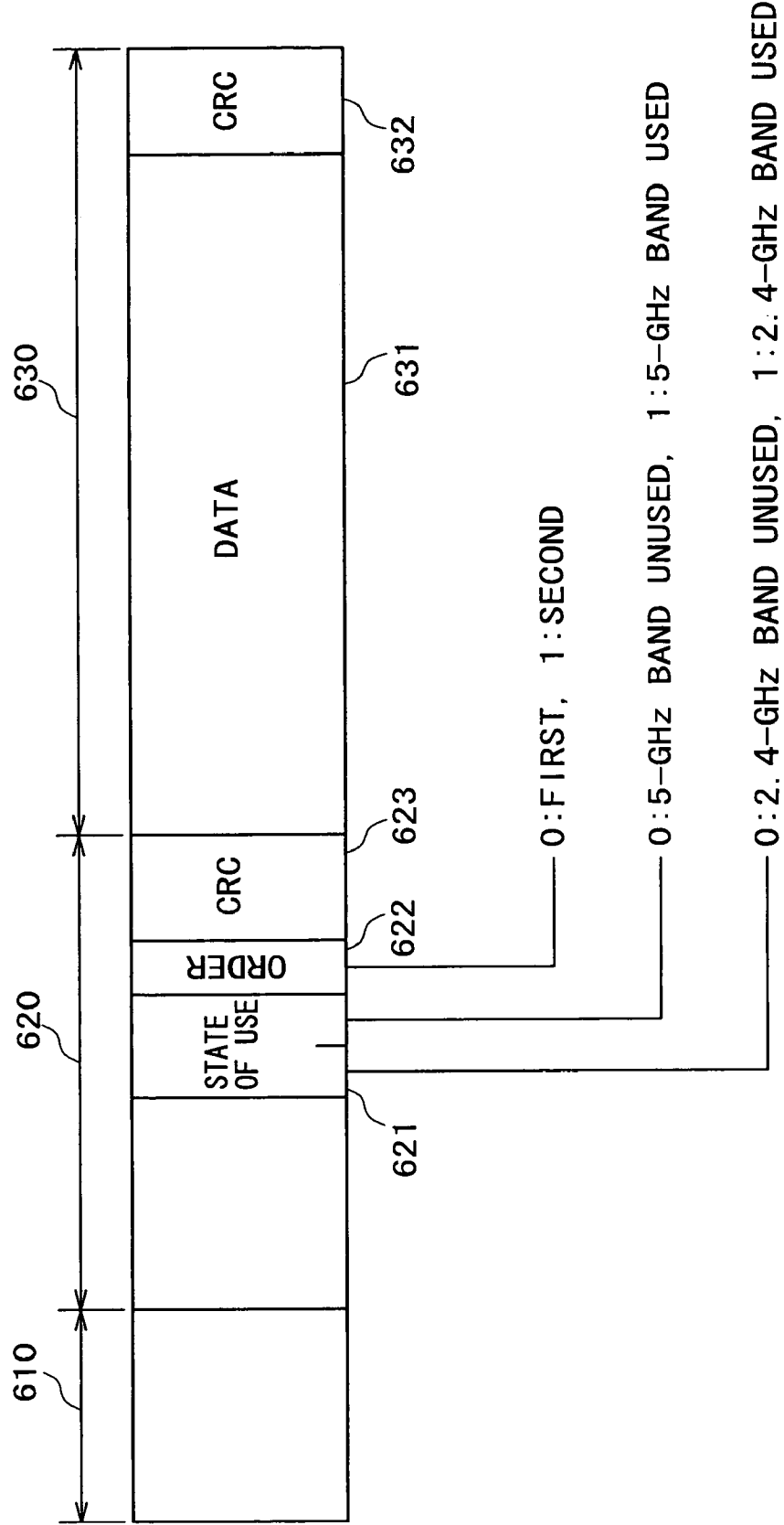
FIG. 7 is a diagram showing a frame structure of a data packet in the embodiment of the present invention.

FIG. 7 is a diagram showing the frame structure of a data packet according to the present invention. The data packet is used when data is transmitted from the terminal station or the base station. The data packet includes a physical layer header 610, a MAC header 620, and a payload 630. The physical layer header 610 is a header of a PLCP (physical layer convergence protocol) frame for transmitting information in a PLCP sublayer as a physical layer, for example. The physical layer header 610 includes fields indicating a transmission speed, a modulation system, PLCP frame length and the like. The MAC header 620 is a header of a MAC frame for transmitting information in a MAC sublayer. The MAC header 620 includes fields indicating a frame type, frame transmitting and receiving addresses and the like. The payload 630 is a payload of the MAC frame. The payload 630 includes data 631 and CRC 632.

In accordance with the present invention, the MAC header 620 in the data packet includes fields of a state of use 621, order 622, and CRC 623. The state of use 621 is a field indicating the state of use of each frequency band when this frame is transmitted. One bit is assigned to each frequency band. For example, a first bit of "0" indicates that the 2.4-GHz band is not used, whereas a first bit of "1" indicates that the 2.4-GHz band is used. Similarly, a second bit of "0" indicates that the 5-GHz band is not used, whereas a second bit of "1" indicates that the 5-GHz band is used. Thus, the receiving units 110 and 210 receiving a frame are able to know whether there is a frame transmitted simultaneously in the other frequency band. The order 622 is a field indicating the order of pieces of data transmitted simultaneously. Supposing that two pieces of data are distributed simultaneously, for example, the order 622 of "0" indicates the first piece of data, whereas the order 622 of "1" indicates the second piece of data. The CRC 623 is a cyclic redundancy check code for detecting a data error in the MAC header 620.

In frame transmission, the data dividing part 331 of the communication control unit 300 generates the state of use 621 of each frequency band and the order 622, and adds the state of use 621 and the order 622 to the MAC header 620. On a frame receiving side, the data merging part 371 of the communication control unit 300 stores the data in the data buffer 372 according to the order 622.

The data 631 is divided under the following conditions.

Figure 8:
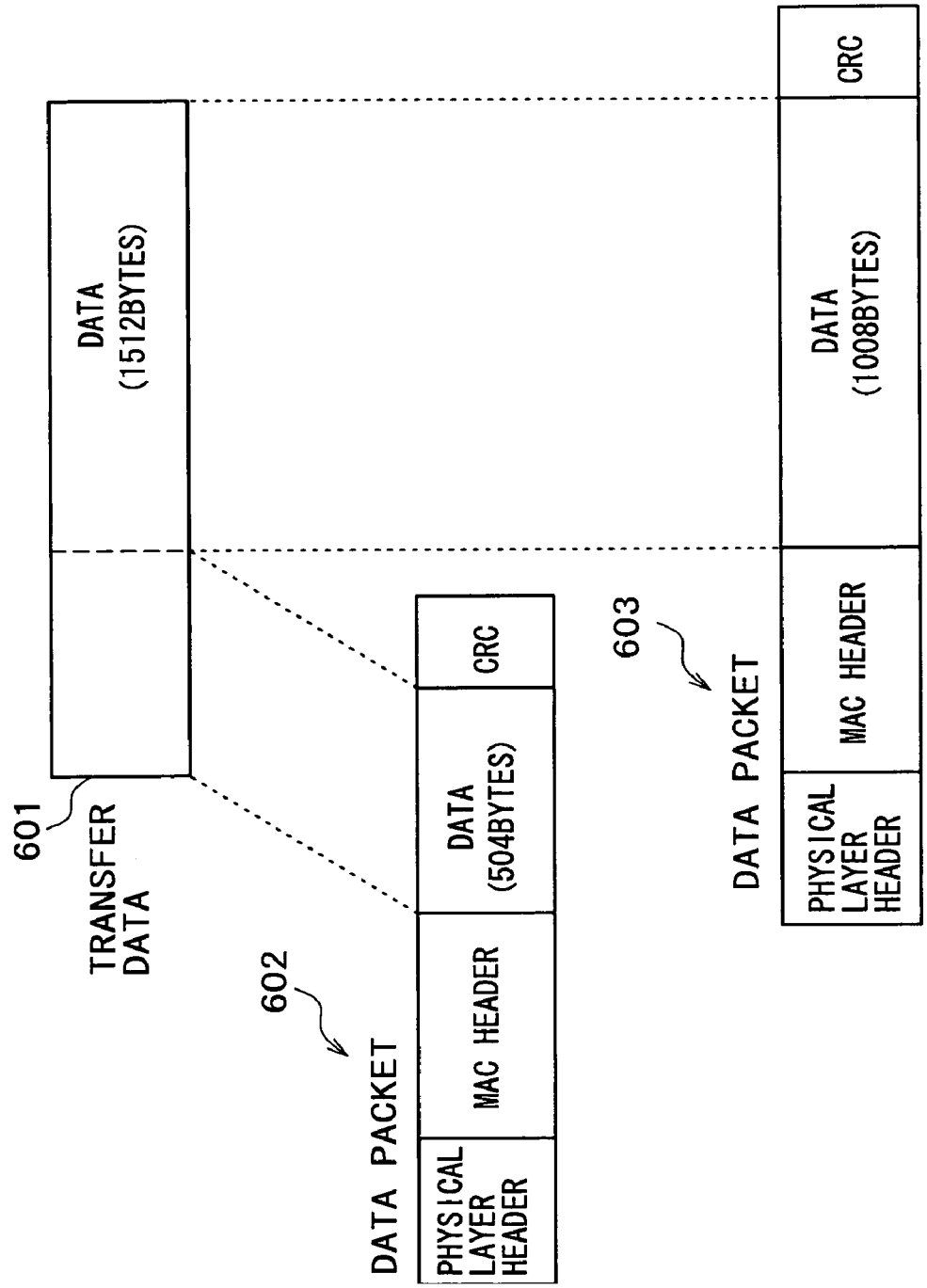
FIG. 8 is a diagram showing an example of data division in the embodiment of the present invention.

FIG. 8 is a diagram showing an example of data division according to the present invention. A description will be made of an example in which data 601 to be transferred is divided into two pieces of data and the two pieces of data are transmitted by data packets 602 and 603. In this example, the data 601 to be transferred is 1512 bytes, the data included in the data packet 602 is 504 bytes, and the data included in the data packet 603 is 1008 bytes. Conditions for the division include a modulation mode of QPSK and a coding rate of 1/2 for the data packet 602 and a modulation mode of 16 QAM and a coding rate of 1/2 for the data packet 603. These conditions equalize the time required to transmit the data of 504 bytes included in the data packet 602 with the time required to transmit the data of 1008 bytes included in the data packet 603.

Letting r1 and r2 be coding rates and m1 and m2 be the numbers of bits of the modulation systems of the first part and the second part, transmission times of the first part and the second part are equal to each other when the data is divided according to the ratio $$m1 \times r1 : m2 \times r2$$

In the above example, $$2 \times (1/2) : 4 \times (1/2) = 1:2$$

The ratio of the first part to the second part is 1:2. As another example, suppose that the modulation mode of the first part is BPSK and the coding rate of the first part is 1/2 and that the modulation mode of the second part is 64 QAM and the coding rate of the second part is 3/4. Then $$1 \times (1/2) : 6 \times (3/4) = 1:9$$

Such data division can equalize the times required for transmission.

Incidentally, a detailed calculation taking the MAC header and the CRC of the data into consideration is as follows. It is assumed, however, that the physical layer header does not change the modulation mode and indicates the same modulation mode in each transmission. Supposing that the MAC header is 30 bytes, the CRC of the data is 4 bytes, the number of bytes of the data to be transmitted is d, the numbers of bytes of the data of the first part and the data of the second part are d1 and d2, respectively, the numbers of bytes of the modulation systems of the first part and the second part are m1 and m2, respectively, and the coding rates of the first part and the second part are r1 and r2, respectively, from the condition of equalizing the times required to transmit the data of the first part and the data of the second part, the following equations hold:

$$(30+d1+4)/(m1 \times r1) = (30+d2+4)/(m2 \times r2)$$

$$d = d1 + d2$$

Solving the equations for d1 and d2, $$d1 = d \times (m1 \times r1)/(m1 \times r1 + m2 \times r2) + 34 \times (m1 \times r1 - m2 \times r2)/(m1 \times r1 + m2 \times r2)$$

$$d2 = d \times (m2 \times r2)/(m1 \times r1 + m2 \times r2) + 34 \times (m2 \times r2 - m1 \times r1)/(m1 \times r1 + m2 \times r2)$$

When the packet is defined including information transmitted depending on the modulation mode as a part of the physical layer header, the value at a position corresponding to "34" in the second term on the right side of the equations is changed as appropriate. Of course, when the data length of the MAC header is different, the value at the position corresponding to "34" is changed as appropriate.

Figure 9:
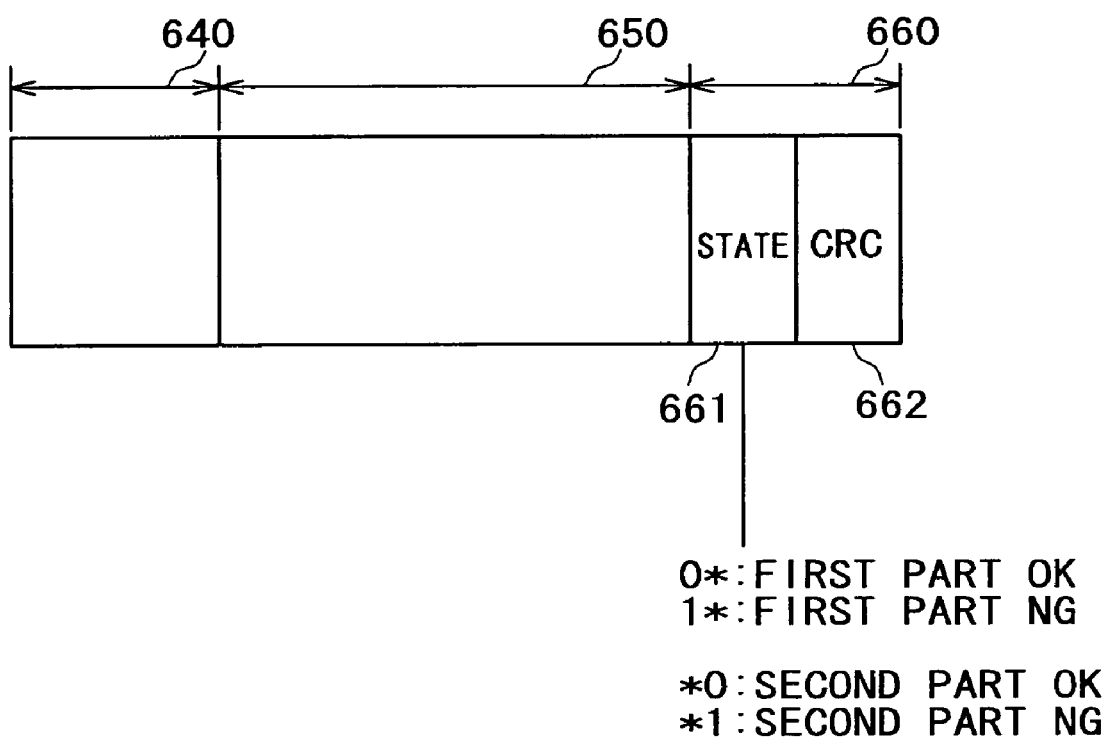
FIG. 9 is a diagram showing a frame structure of a response packet in the embodiment of the present invention.

FIG. 9 is a diagram showing a frame structure of a response packet according to the present invention. The response packet is returned from a terminal station or a base station that has received data to a terminal station or a base station as the transmitter of the data. The response packet comprises a physical layer header 640, a MAC header 650, and a payload 660. The physical layer header 640 and the MAC header 650 are similar to the physical layer header 610 and the MAC header 620 of the data packet in FIG. 7 in that the physical layer header 640 is a header of a PLCP frame for transmitting information in the PLCP sublayer and the MAC header 650 is a header of a MAC frame for transmitting information in the MAC sublayer.

The response packet in the embodiment of the present invention includes fields of a state 661 and CRC 662 in the payload 660. The state 661 is a field indicating the state of reception of the divided data. The CRC 662 is a cyclic redundancy check code for detecting a data error in the MAC header 650 and the payload 660.

The state 661 includes all states of reception of the data divided and transmitted simultaneously. Hence, a response packet in frequency band A, for example, includes not only the state of reception in frequency band A but also the state of reception in frequency band B. Thus, the state 661 includes information corresponding to the number of divided pieces of data. When the data is divided into two pieces for transmission, a first bit indicates the state of reception of the first part and a second bit indicates the state of reception of the second part, for example. Specifically, when the first part is received successfully, the first bit is "0," whereas when the first part fails to be received, the first bit is "1." Similarly, when the second part is received successfully, the second bit is "0," whereas when the second part fails to be received, the second bit is "1."

The state 661 of the response packet is generated by the response outputting parts A 352 and B 362 on the basis of the results of the determinations in the data determining parts A 351 and B 361 of the communication control unit 300 of the terminal station or the base station that has received the data. The response packet is returned to the terminal station or the base station as the transmitter of the data. The response determining parts A 312 and B 322 of the terminal station or the base station as the transmitter of the data determine the state 661.

The operation of a terminal station and a base station in the embodiment of the present invention will next be described with reference to drawings.

Figure 10:
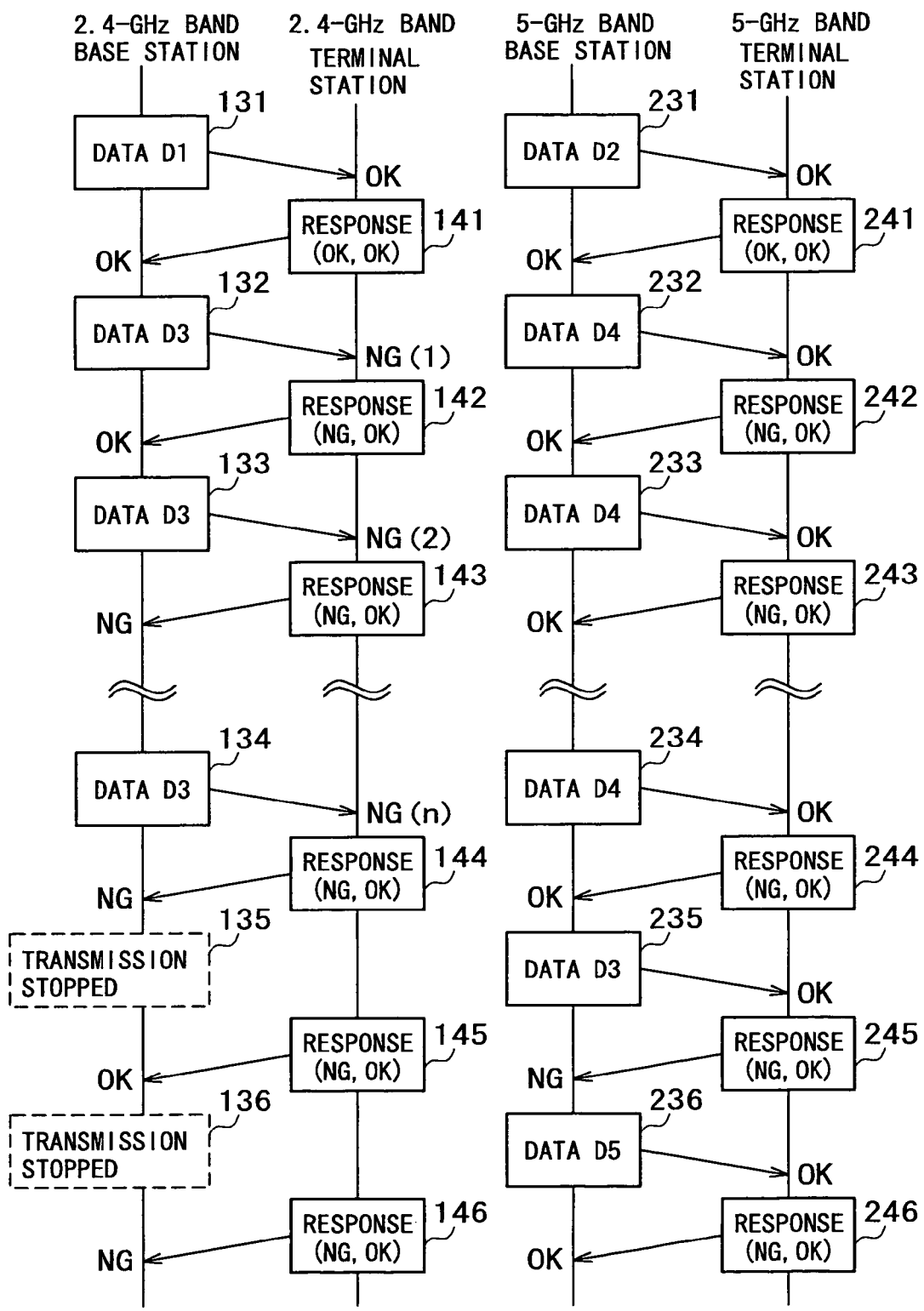
FIG. 10 is a sequence chart of an example of the operation of a terminal station and a base station in the embodiment of the present invention.

FIG. 10 is a sequence chart of an example of the operation of the terminal station and the base station in accordance with the present invention. In this example, suppose that data is transmitted from the base station to the terminal station using a frequency band A (for example, the 2.4-GHz band) and a frequency band B (for example, the 5-GHz band). Processing using frequency band A at the base station is represented as "base station A"; processing using frequency band B at the base station is represented as "base station B"; processing using frequency band A at the terminal station is represented as "terminal station A"; and processing using frequency band B at the terminal station is represented as "terminal station B."

First, the base station divides data into data D1 and data D2, and then simultaneously transmits the data D1 in frequency band A and the data D2 in frequency band B (131 and 231). Suppose that the terminal station has succeeded in receiving the data D1 and the data D2. "OK" or "NG" on the right side of the terminal station A and the terminal station B denotes "success" or "failure," respectively, as the state of data reception. The terminal station returns states of reception in frequency band A and frequency band B as a response to the base station in both frequency band A and frequency band B simultaneously (141 and 241). Suppose that the base station has succeeded in receiving the responses 141 and 241. "OK" or "NG" on the left side of the base station A and the base station B denotes "success" or "failure," respectively, as the state of response reception.

Next, the base station divides data into data D3 and data D4, and then simultaneously transmits the data D3 in frequency band A and the data D4 in frequency band B (132 and 232). Suppose that the terminal station has succeeded in receiving the data D4 but failed in receiving the data D3. The terminal station returns states of reception in frequency band A and frequency band B as a response to the base station in both frequency band A and frequency band B simultaneously (142 and 242). Suppose that the base station has succeeded in receiving the responses 142 and 242.

Since it is determined from the responses 142 and 242 that the data D3 has not been received, the data dividing part 331 simultaneously transmits the data D3 in frequency band A and the data D4 in frequency band B again (133 and 233). Also at this time, suppose that the terminal station has succeeded in receiving the data D4 but failed in receiving the data D3. The terminal station returns states of reception in frequency band A and frequency band B as a response to the base station in both frequency band A and frequency band B simultaneously (143 and 243). At this time, suppose that the base station has succeeded in receiving the response 243 but failed in receiving the response 143.

Since the response 243 includes not only a state of reception in frequency band B but also a state of reception in frequency band A, the data dividing part 331 recognizes that the data D3 has not been received, and tries transmitting the data D3 and the data D4 again. Suppose that a state of communication in frequency band A has deteriorated and that the data D3 and the data D4 are not successfully retransmitted. Suppose that the terminal station has succeeded in receiving the data D4 but failed in receiving the data D3 even after the data dividing part 331 has transmitted the data D3 and the data D4 n consecutive times (134 and 234).

The failure counter A of the counter A 313 counts the number of consecutive times that the data D3 is not received normally in frequency band A. When a response 244 provides a notification that the data D3 has not been received and it is determined that the data transmitted in frequency band A has failed to be received n consecutive times, it is determined that the state of communication in frequency band A has deteriorated, and thereafter data transfer in frequency band A is not performed. Then the data D3 that has not been received is transmitted in frequency band B (235), and is received successfully. Even when a response 245 to the transmission 235 of the data D3 fails to be received in frequency band B, a response 145 in frequency band A is received successfully, whereby the base station recognizes success in the transmission 235 of the data D3.

Since data transmission in frequency band A is stopped, subsequent data D5 and data subsequent to the data D5 are sequentially transmitted in frequency band B (236), while responses 146 and 246 to the transmission continue to be transmitted in frequency band A and frequency band B. The responses 146 and 246 provide a notification describing the state of reception in frequency band A in which transmission is stopped as "failure."

Figure 11:
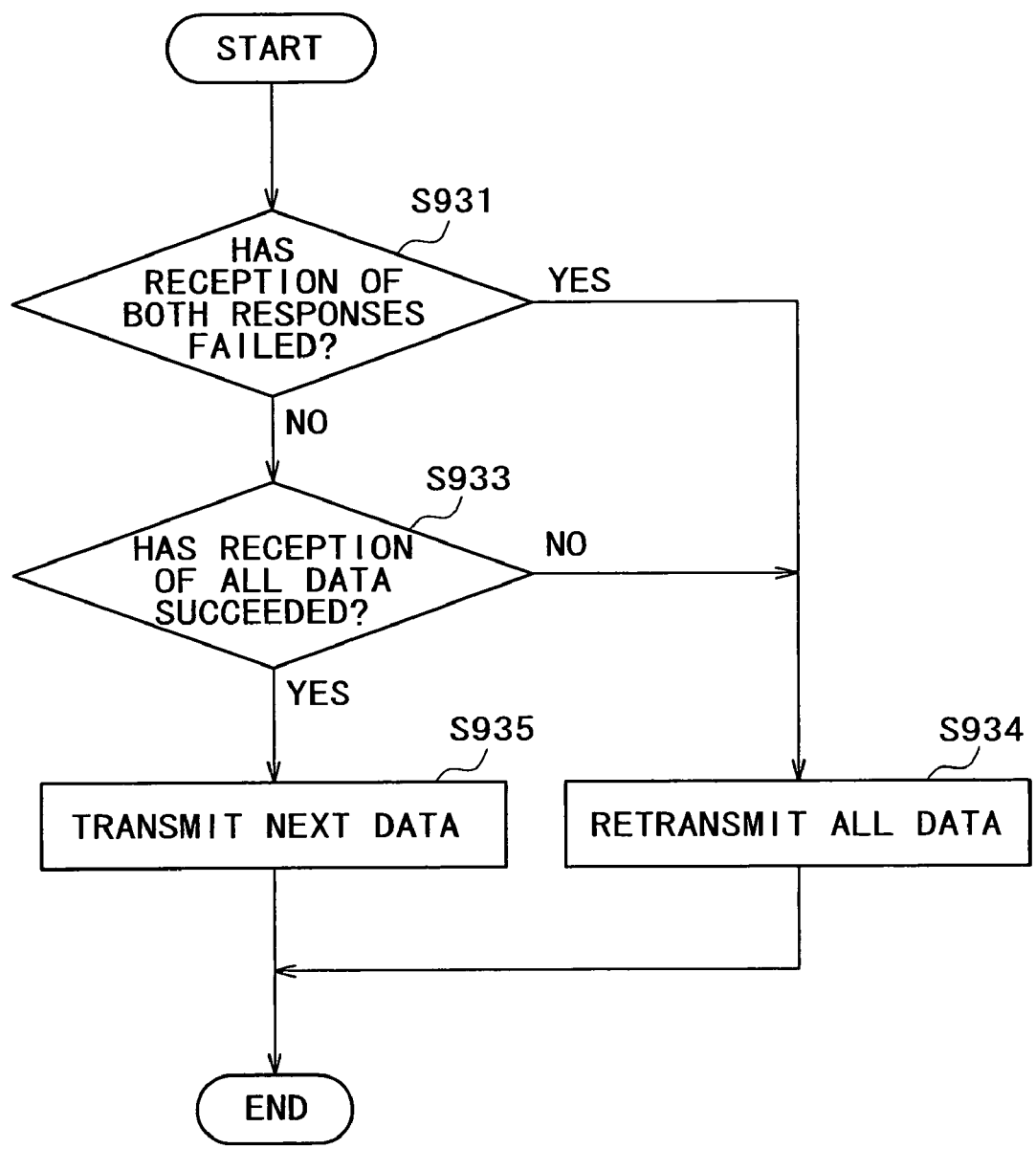
FIG. 11 is a flowchart showing the contents of determination of data retransmission processing in the example of FIG. 10.

FIG. 11 is a flowchart showing the determination of data retransmission processing in the example of FIG. 10. In the example of FIG. 10, when the data D3 (132) fails to be received in frequency band A, the data D3 is retransmitted in frequency band A (133), and at the same time, the data D4 that has been received normally is also retransmitted in frequency band B (233). The determination in this case is made as follows. First, when no response is received in either frequency band A or frequency band B (step S931), it is not possible to determine whether transmitted data has been received, and therefore the data is retransmitted in frequency band A and frequency band B (step S934). Incidentally, this includes the case where data transmission cannot be made in either frequency band A or frequency band B as a result of the unavailability of these frequency bands as indicated by the carrier sense units at step S931.

When a response is received in either frequency band A or frequency band B, but it is determined from the contents of the response that one piece of the transmitted data has not been received (step S933), each piece of the data is retransmitted in frequency band A and frequency band B (step S934). Also, step S934 is carried out when data transmission cannot be made in one of frequency band A and frequency band B as a result of the unavailability of that frequency band as indicated by the appropriate carrier sense unit.

On the other hand, when it is determined from the contents of the response that all the transmitted data has been received (step S933), the next new data is transmitted (step S935). Incidentally, when the transmitted data is retransmitted data and includes data that has been successfully received previously, whether all the transmitted data including the data successfully received previously has been successfully received is determined at step S933.

Figure 12:
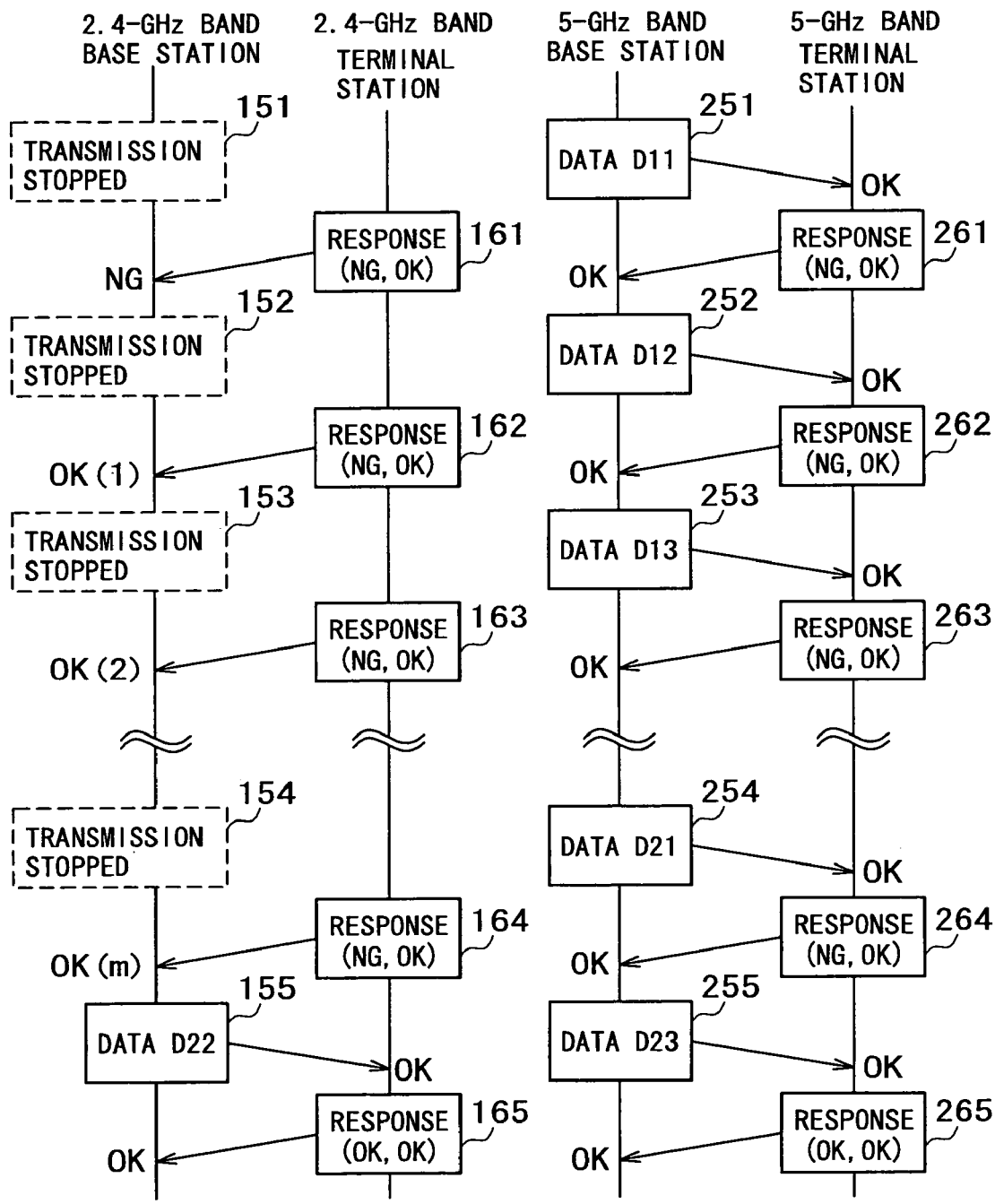
FIG. 12 is a sequence chart of another example of the operation of a terminal station and a base station in the embodiment of the present invention.

FIG. 12 is a sequence chart of another example of the operation of the terminal station and the base station in accordance with the present invention. In this example, suppose that transmission in frequency band A is stopped as in the last state in FIG. 10. Thus, the base station transmits data D11 in frequency band B (251). Suppose that the terminal station has succeeded in receiving the data D11. The terminal station returns the states of reception in frequency band A and frequency band B as a response to the base station in both frequency band A and frequency band B simultaneously (161 and 261). However, the state of reception in frequency band A in which transmission is stopped is notified as "failure." Suppose that the base station has succeeded in receiving the response 261 in frequency band B but failed in receiving the response 161 in frequency band A.

Next, the base station transmits data D12 in frequency band B (252). Suppose that the terminal station has succeeded in receiving the data D12. The terminal station returns the states of reception in frequency band A and frequency band B as a response to the base station in both frequency band A and frequency band B simultaneously (162 and 262). Suppose that the base station has succeeded in receiving the responses 162 and 262.

Further, the base station transmits data D13 in frequency band B (253). Suppose that the terminal station has succeeded in receiving the data D13. The terminal station returns the states of reception in frequency band A and frequency band B as a response to the base station in both frequency band A and frequency band B simultaneously (163 and 263). Suppose that the base station has succeeded in receiving the responses 163 and 263.

After similar processing is repeated, the base station transmits data D21 in frequency band B (254). Suppose that the base station has successfully received the responses 164 and 264.

The success counter A of the counter A 313 counts the number of consecutive times that a response is received normally in frequency band A. When the response 164 is received normally and it is determined that the reception of a response in frequency band A has succeeded m consecutive times, it is determined that the state of communication in frequency band A has improved, and thereafter data transfer in frequency band A is performed. Thus, subsequent data D22 and data D23 are divided in frequency band A and frequency band B, and transmitted simultaneously (155 and 255).

Figure 13:
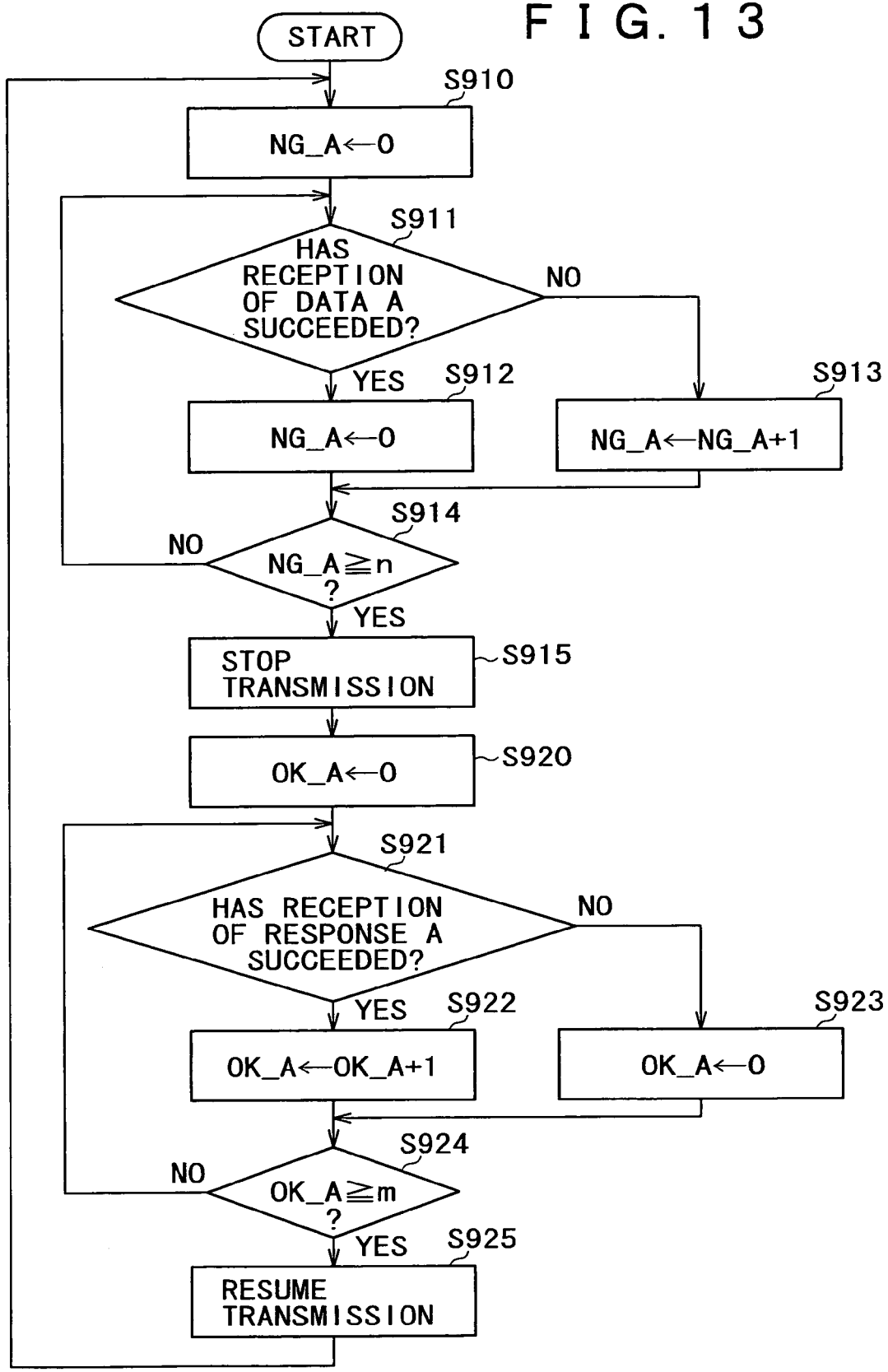
FIG. 13 is a flowchart showing control of stopping and resuming of transmission by a counter A in the embodiment of the present invention.

FIG. 13 is a flowchart showing the control of stopping and resuming transmission by the counter A 313 in accordance with the present invention. In this flowchart, the success counter A in the counter A 313 is denoted by OK_A, and the failure counter A in the counter A 313 is denoted by NG_A.

The failure counter A (NG_A) is cleared to zero in advance (step S910). When the reception of data transmitted in frequency band A succeeds (step S911), the failure counter A (NG_A) is cleared to zero (step S912). On the other hand, when the reception of the data transmitted in frequency band A fails (step S911), one is added to the failure counter A (step S913). When the failure counter A consequently indicates a predetermined number "n" or more (step S914), data transmission in frequency band A is thereafter stopped (step S915). In a state where data transmission in frequency band A is being made (transmission mode), the processing at steps S911 to S914 is repeated.

The success counter A (OK_A) is cleared to zero in advance (step S920). Even in a state where data transmission in frequency band A is stopped (transmission stop mode), responses continue to be transmitted in frequency band A. When the reception of a response in frequency band A succeeds (step S921), one is added to the success counter A (step S922). On the other hand, when the reception of the response in frequency band A fails (step S921), the success counter A (OK_A) is cleared to zero (step S923). When the success counter A consequently indicates a predetermined number "m" or more (step S924), data transmission in frequency band A is thereafter resumed (step S925). In a state where data transmission in frequency band A is stopped (transmission stop mode), the processing at steps S921 to S924 is repeated.

Figure 14:
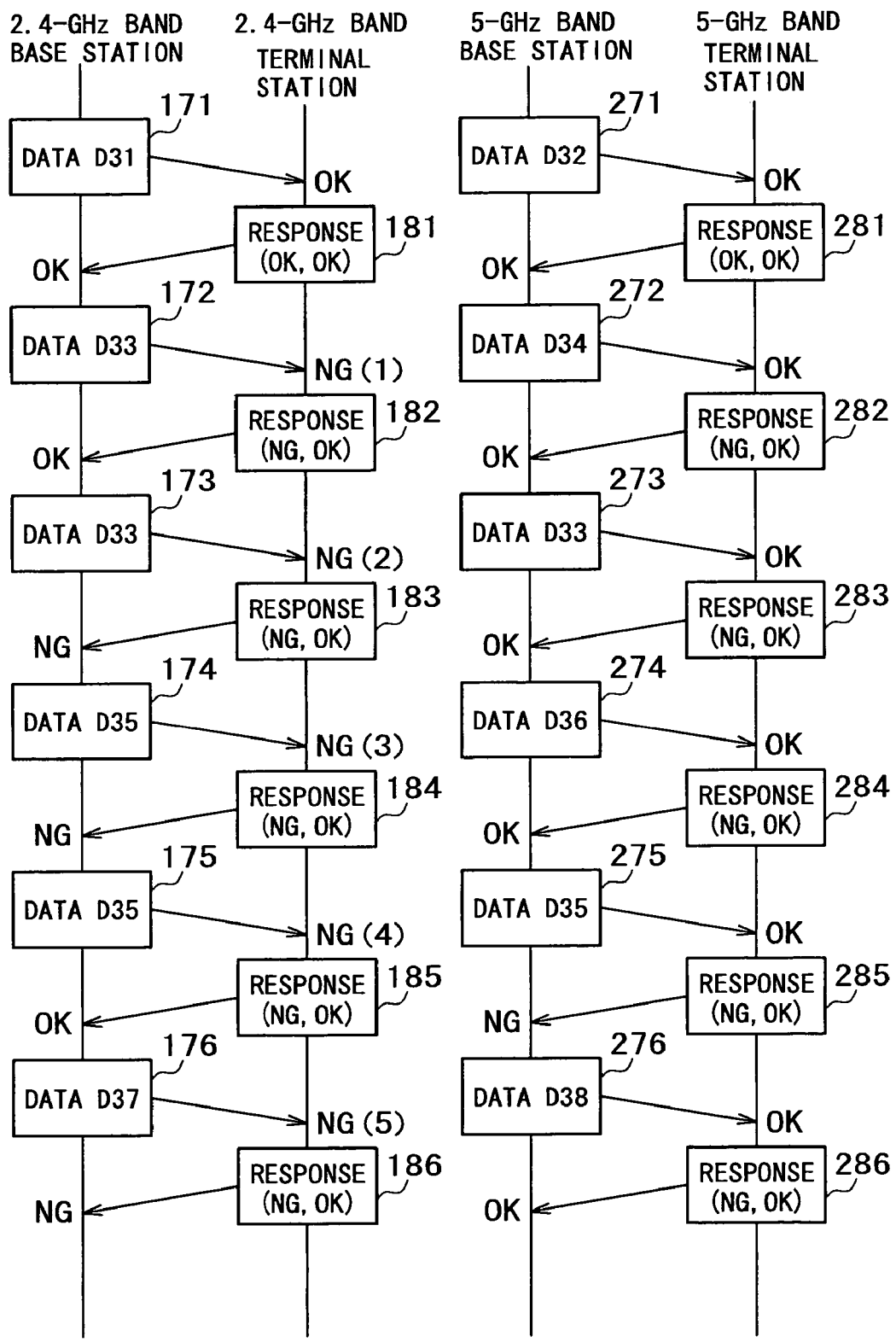
FIG. 14 is a sequence chart of a further example of the operation of a terminal station and a base station in the embodiment of the present invention.

FIG. 14 is a sequence chart of a further example of the operation of the terminal station and the base station in accordance with the present invention. In the example of FIG. 10, when the data D3 (132) fails to be received in frequency band A, the data D3 is retransmitted in frequency band A (133), and at the same time, the data D4 that has already been received normally is also retransmitted in frequency band B (233). In the example of FIG. 14, when data fails to be received in one of the frequency bands, the data that fails to be received is transmitted in the other frequency band simultaneously without data already received normally being transmitted, whereby communication efficiency is improved.

First, the base station divides data into data D31 and data D32, and then simultaneously transmits the data D31 in frequency band A and the data D32 in frequency band B (171 and 271). Suppose that the terminal station has succeeded in receiving the data D31 and the data D32. The terminal station returns the states of reception in frequency band A and frequency band B as a response to the base station in both frequency band A and frequency band B simultaneously (181 and 281). Suppose that the base station has succeeded in receiving the responses 181 and 281.

Next, the base station divides data into data D33 and data D34, and then simultaneously transmits the data D33 in frequency band A and the data D34 in frequency band B (172 and 272). Suppose that the terminal station has succeeded in receiving the data D34 but failed in receiving the data D33. The terminal station returns the states of reception in frequency band A and frequency band B as a response to the base station in both frequency band A and frequency band B simultaneously (182 and 282). Suppose that the base station has succeeded in receiving the responses 182 and 282.

Since it is determined from the responses 182 and 282 that the data D33 has not been received, the data dividing part 331 simultaneously transmits the data D33 in frequency band A and frequency band B (173 and 273). Suppose that the terminal station has failed in receiving the data D33 in frequency band A but succeeded in receiving the data D33 in frequency band B. The states of reception are similarly returned as a response from the terminal station to the base station in both frequency band A and frequency band B simultaneously (183 and 283). At this time, suppose that the base station has succeeded in receiving the response 283 but failed in receiving the response 183.

Incidentally, in the transmission (173 and 273) of the data D33, it is desirable that the modulation mode be the same in frequency band A and frequency band B. In this case, it is considered that the modulation mode in frequency band B in which the reception of the data D34 (272) has succeeded is used. However, when the state of communication in frequency band A is relatively good and the error is considered to be caused by a bit error, for example, the modulation mode in frequency band A in which reception has failed can be used. When limitations of the transmitting and receiving apparatus make it impossible to change the modulation mode, the data D33 may be transmitted without changing the modulation mode.

When it is determined from the response 283 that the data D33 has been received normally, the base station divides the next transmitted data into data D35 and data D36, and then simultaneously transmits the data D35 in frequency band A and the data D36 in frequency band B (174 and 274). Suppose that the terminal station has succeeded in receiving the data D36 but failed in receiving the data D35. The terminal station returns the states of reception in frequency band A and frequency band B as a response to the base station in both frequency band A and frequency band B simultaneously (184 and 284). At this time, suppose that the base station has succeeded in receiving the response 284 but failed in receiving the response 184.

Since it is determined from the response 284 that the data D35 has not been received, the data dividing part 331 simultaneously transmits the data D35 in frequency band A and frequency band B (175 and 275). Thereafter, when data fails to be received in one of the frequency bands, the data that fails to be received is similarly transmitted in the other frequency band simultaneously.

Figure 15:
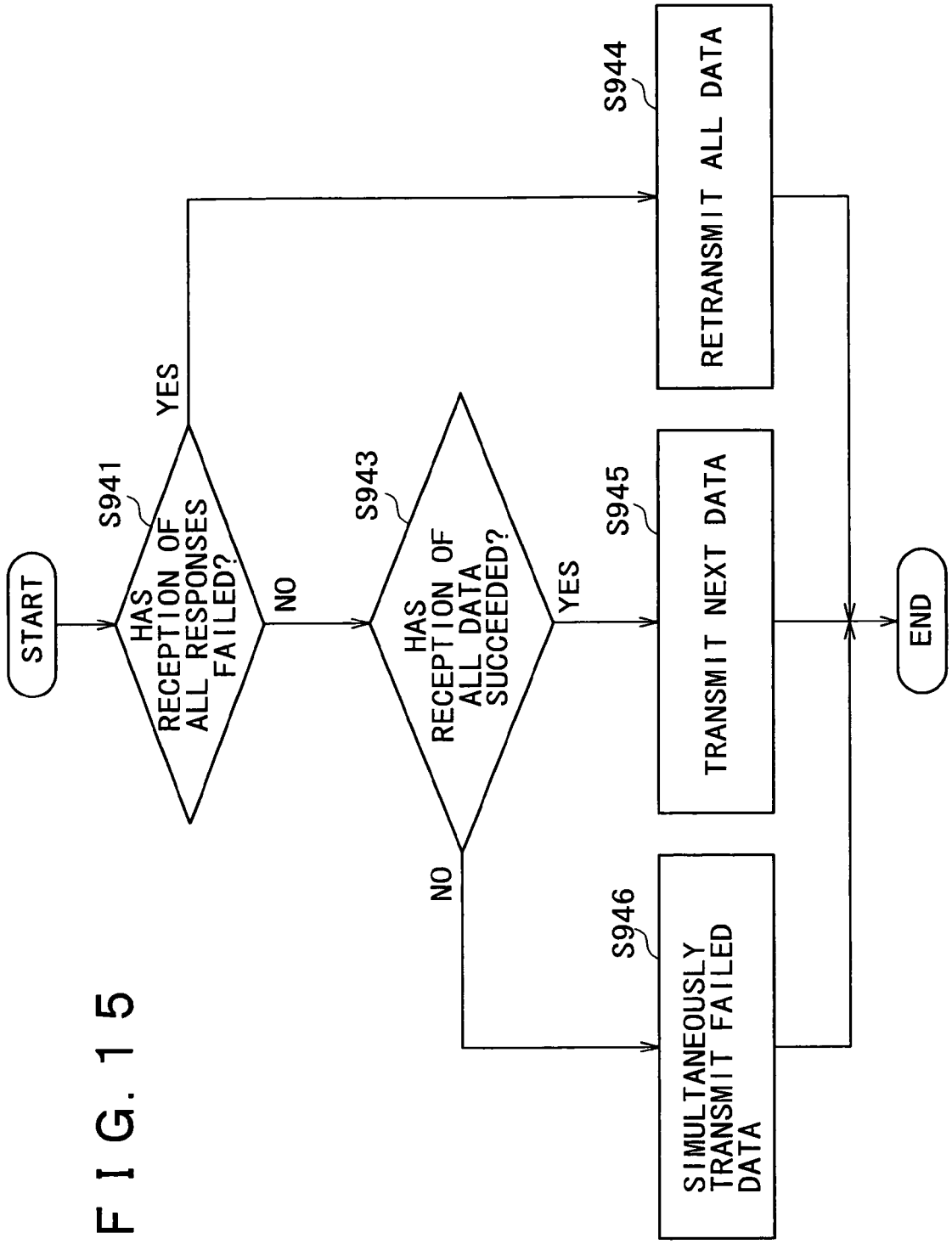
FIG. 15 is a flowchart showing an example of the contents of determination of data retransmission processing in the example of FIG. 14.

FIG. 15 is a flowchart showing an example of the determination of data retransmission processing in the example of FIG. 14. In this case, consideration will be given to the case where different pieces of data are divided and transmitted in frequency band A and frequency band B. In the example of FIG. 14, when the data D33 fails to be received in one of the frequency bands as in the transmission 172, the data D33 is transmitted in both frequency band A and frequency band B (173 and 273). The determination in this case is made as follows. First, when no response is received in either frequency band A or frequency band B (step S941), it is not possible to determine whether transmitted data has been received, and therefore the data is retransmitted in frequency band A and frequency band B (step S944). Incidentally, step S944 is also carried out in the case where data transmission cannot be made in either frequency band A or frequency band B as a result of the unavailability of these frequency bands as indicated by the carrier sense units at step S941.

When a response is received in either frequency band A or frequency band B, but it is determined from the contents of the response that one piece of the transmitted data has not been received (step S943), the data that has not been received is transmitted in both frequency band A and frequency band B (step S946). Incidentally, step S946 is carried out when data transmission cannot be made in one of frequency band A and frequency band B as a result of the unavailability of that frequency band as indicated by the appropriate carrier sense unit. On the other hand, when it is determined that all the transmitted data has been received (step S943), the next new data is transmitted (step S945). Incidentally, when the transmitted data is retransmitted data and includes data that has been successfully received previously, whether all the transmitted data including the data successfully received previously has been successfully received is determined at step S943.

Figure 16:
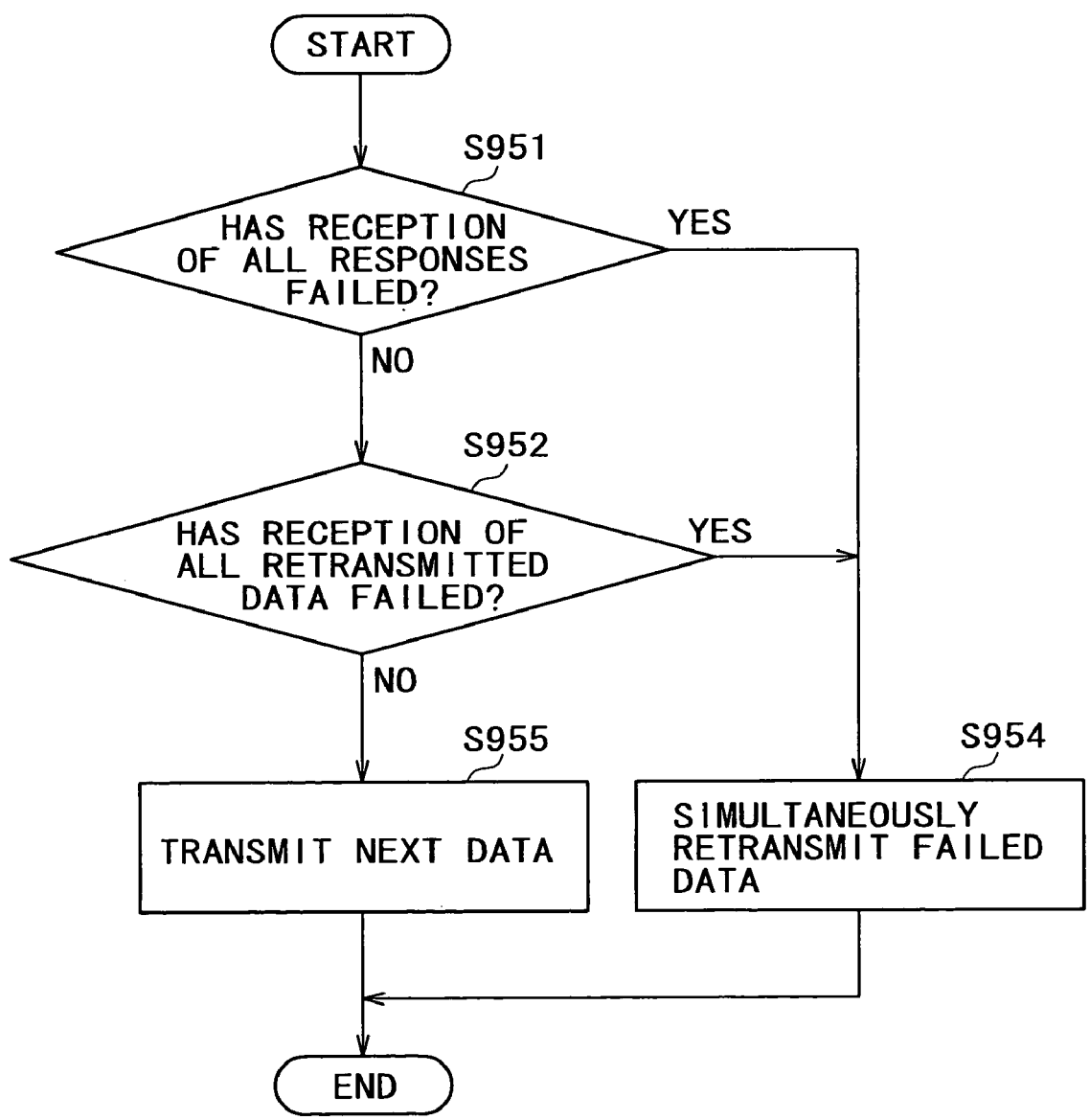
FIG. 16 is a flowchart showing another example of the contents of determination of data retransmission processing in the example of FIG. 14.

FIG. 16 is a flowchart showing another example of the determination of data retransmission processing in the example of FIG. 14. In this case, consideration will be given to the case where the same data is transmitted in frequency band A and frequency band B simultaneously. In the example of FIG. 14, there can be a case where data is retransmitted in both frequency band A and frequency band B as in the transmissions 173 and 273 of the data D33. The determination in this case is made as follows. First, when no response is received in either frequency band A or frequency band B (step S951), it is not possible to determine whether transmitted data has been received, and therefore the same data (failed data) is retransmitted in frequency band A and frequency band B simultaneously (step S954). Incidentally, step S954 is also carried out in the case where data transmission cannot be made in either frequency band A or frequency band B as a result of the unavailability of these frequency bands as indicated by the carrier sense units at step S951.

When a response is received in either frequency band A or frequency band B, but it is determined from the contents of the response that all of the retransmitted data has not been received (step S952), the same data is retransmitted in frequency band A and frequency band B (step S954). On the other hand, when it is determined that the retransmitted data has been received in one of the frequency bands (step S952), the next new data is divided and transmitted (step S955).

A description will next be made of an example of the configuration of a radio communication system in accordance with the present invention.

FIG. 17 is a diagram showing an example of the configuration of a radio communication system in accordance with the present invention. A base station 21 is connected to a network 30 via a network interface. The Internet or an intranet, for example, can be assumed as the network 30. Terminal stations 11 and 12 are connected to a computer or the like via a peripheral interface. The terminal stations 11 and 12 communicate with the base station 21 by radio, and access the network 30 via the base station 21.

For example, suppose that the base station 21 can perform transmission and reception in two frequency bands simultaneously by the configuration of FIG. 2, and performs transmission and reception in accordance with the IEEE802.11b and IEEE802.11g standards in a 2.4-GHz band and performs transmission and reception in accordance with the IEEE802.11a standard in a 5-GHz band. In this case, when the terminal station 11 has a similar configuration, data can be divided and then transmitted and received in the 2.4-GHz band and the 5-GHz band simultaneously between the base station 21 and the terminal station 11.

When the terminal station 12 is made by conventional techniques and performs transmission and reception in one frequency band, transmission and reception in accordance with the IEEE802.11b and IEEE802.11g standards in the 2.4-GHz band or transmission and reception in accordance with the IEEE802.11a standard in the 5-GHz band is performed between the base station 21 and the terminal station 12.

When the base station 21 is made by conventional techniques, transmission and reception in accordance with the IEEE802.11b and IEEE802.11g standards in the 2.4-GHz band or transmission and reception in accordance with the IEEE802.11a standard in the 5-GHz band is also performed between the base station 21 and the terminal station 11 of the configuration of FIG. 2.

Thus, according to the embodiment of the present invention, data to be transmitted is divided by the data dividing part 331 and transmitted by the transmitting units 120 and 220 for different frequency bands simultaneously on the transmitting apparatus side, and the data received by the receiving units 110 and 210 for the different frequency bands is merged by the data merging part 371 on the receiving apparatus side. As a result, efficient data communication can be realized. For example, while the transmission speed of the IEEE802.11a standard is 54 Mbps at a maximum, double the transmission speed can be obtained in theory when two frequency bands are used as in the embodiment of the present invention. This transmission speed is comparable to that of 100Base-T Ethernet (trademark) of wired networks.

It is to be noted that while in the embodiment of the present invention, the transmitting side stops transmission when the receiving side has failed to receive data a predetermined number of consecutive times, the transmitting side may change to a modulation mode with higher noise resistance instead of stopping transmission. Also, while in the embodiment of the present invention, the transmitting side resumes transmission when it has succeeded in receiving a response a predetermined number of consecutive times when in the state in which transmission is stopped, the transmitting side may change to a modulation mode with lower noise resistance when it has continued transmission instead of stopping transmission and has succeeded in receiving a response a predetermined number of consecutive times. The noise resistance is increased in the following ascending order: a modulation mode with a modulation system of 64 QAM and a coding rate of 3/4, a modulation mode with a modulation system of 64 QAM and a coding rate of 2/3, a modulation mode with a modulation system of 16 QAM and a coding rate of 3/4, a modulation mode with a modulation system of 16 QAM and a coding rate of 1/2, a modulation mode with a modulation system of QPSK and a coding rate of 3/4, a modulation mode with a modulation system of QPSK and a coding rate of 1/2, a modulation mode with a modulation system of BPSK and a coding rate of 3/4, and a modulation mode with a modulation system of BPSK and a coding rate of 1/2.

A modification of the embodiment of the present invention will next be described with reference to the drawings. While the above-described embodiment supposes using different frequency bands as transmission paths for simultaneous transmission and reception, communication may be performed by transmission paths using different channels in an identical frequency band, as described below. Also, communication may be performed by transmission paths having different transfer functions in an identical channel.

Figure 18:
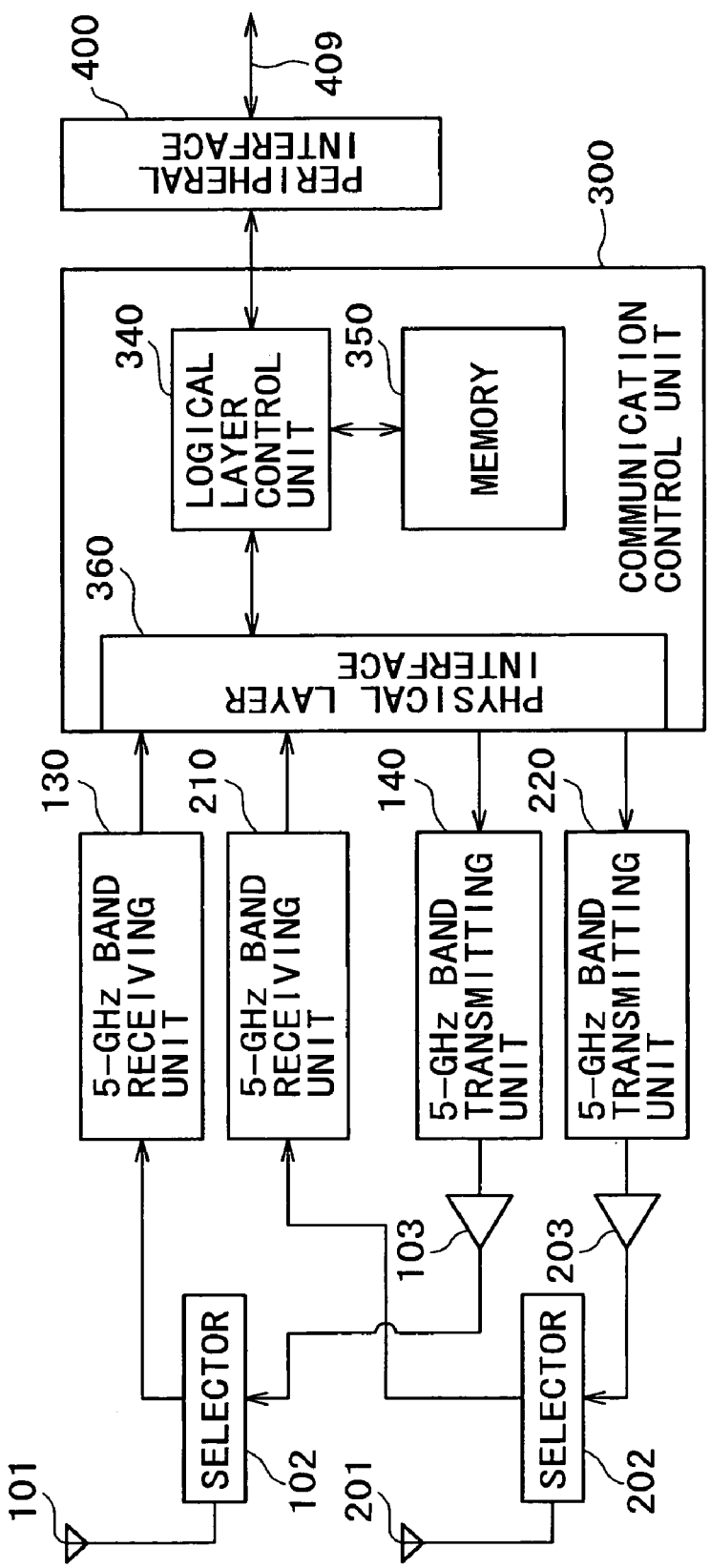
FIG. 18 is a diagram showing a first modified configuration of the terminal station or the base station in the embodiment of the present invention.

FIG. 18 is a diagram showing a first modified configuration of the terminal station or the base station in accordance with the present invention. In this configuration example, as compared with the configuration example of FIG. 2, the 2.4-GHz band receiving unit 110 is replaced with a 5-GHz band receiving unit 130, and the 2.4-GHz band transmitting unit 120 is replaced with a 5-GHz band transmitting unit 140. Accordingly, simultaneous transmission and reception can be performed using a plurality of different channels in an identical frequency band. Supposing the OFDM system of the IEEE802.11a standard, for example, four channels are arranged at intervals of 20 MHz in a frequency band of 100 MHz at the 5-GHz band in Japan. Thus, simultaneous transmission and reception can be performed using channels different from each other in the identical frequency band.

Even in such a case of using a plurality of different channels in an identical frequency band, data reception control and data transmission control by communication control unit 300 are similar to those in FIG. 5 and FIG. 6 using different frequency bands.

While the configuration example of FIG. 18 performs simultaneous transmission and reception using a plurality of different channels in an identical frequency band, different channels in different frequency bands and in identical frequency bands may be selected appropriately. FIG. 19 is a diagram showing a second modified configuration of the terminal station or the base station according to the present invention. In this configuration example, outputs of a 2.4-GHz band transmitting unit 120 and a 5-GHz band transmitting unit 140 are passed through power amplifiers 103 and 104, respectively, and then input to a selector 105. One of the outputs is supplied to a selector 102 as a signal to be transmitted. Also, outputs of a 2.4-GHz band transmitting unit 240 and a 5-GHz band transmitting unit 220 are passed through power amplifiers 204 and 203, respectively, and then input to a selector 205. One of the outputs is supplied to a selector 202 as a signal to be transmitted. It is thereby possible to appropriately select simultaneous transmission using the 2.4-GHz band and the 5-GHz band, simultaneous transmission using different channels in the 2.4-GHz band, or simultaneous transmission using different channels in the 5-GHz band.

A received signal in the selector 102 is supplied to a 2.4-GHz band receiving unit 110 and a 5-GHz band receiving unit 130. A received signal in the selector 202 is supplied to a 2.4-GHz band receiving unit 230 and a 5-GHz band receiving unit 210. It is thereby possible to appropriately select simultaneous reception using the 2.4-GHz band and the 5-GHz band, simultaneous reception using different channels in the 2.4-GHz band, or simultaneous reception using different channels in the 5-GHz band.

While the configuration example of FIG. 18 performs simultaneous transmission and reception using a plurality of different channels in an identical frequency band, it is possible to use an identical channel in an identical frequency band. For example, frequency characteristics of a transfer function differ between a propagation path in which a radio wave transmitted from a transmitting station reaches a receiving station after hitting a reflector twice and a propagation path in which a radio wave transmitted from the transmitting station reaches the receiving station after hitting a reflector five times. Hence, these propagation paths can be treated as different paths. The configuration example of FIG. 20 is an example using such propagation paths having different transfer functions.

FIG. 20 is a diagram showing a third modified configuration of the terminal station or the base station in accordance with the present invention. This configuration example uses MIMO (Multiple Input Multiple Output) technology. An interference compensator 192 is provided in a stage preceding receiving units 130 and 210, and a space-time coder 291 is provided in a stage succeeding power amplifiers 103 and 203. The interference compensator 192 is an interference canceller. The interference compensator 192 individually separates different signals of a plurality of transfer functions mixed in an identical channel. The space-time coder 291 performs encoding combining a temporal dimension with a spatial dimension over a plurality of antennas.

Even in the case of using propagation paths having different transfer functions in an identical channel, the data reception control and data transmission control of a communication control unit 300 are similar to those in FIG. 5 and FIG. 6 using different frequency bands.

Thus, according to the modified embodiments of the present invention, it is possible to perform simultaneous transmission and reception using not only different frequency bands, but also different channels in an identical frequency band. Further, it is possible to perform simultaneous transmission and reception using propagation paths having different transfer functions in an identical channel. That is, in the present invention, when communication is performed by different transmission paths simultaneously, different frequency bands may be used, different channels of an identical frequency band may be used, or propagation paths having different transfer functions in an identical channel may be used.

As an example of the application of the present invention, the present invention may be used in communications by a plurality of different transmission paths in a radio communication system.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A transmitting apparatus, comprising:
a data dividing unit to divide data into pieces of data to be transmitted;
a data outputting unit to add a distribution order to the divided pieces of data to form transmission data;
a transmitter to transmit the transmission data in different transmission paths simultaneously; and
a response determining unit to determine a response to a previous data transmission in each of the different transmission paths,
wherein when the responses to previous data transmissions indicate that the transmission data in the previous data transmissions has failed to be received at least a predetermined number of times in one of the transmission paths, said data dividing unit divides the data such that there are no subsequent transmissions in the one transmission path.

2. A transmitting apparatus, comprising:
a data dividing unit to divide data into pieces of data to be transmitted;
a data outputting unit to add a distribution order to the divided pieces of data to form transmission data;
a transmitter to transmit the transmission data in different transmission paths simultaneously; and
a response determining unit to determine a response to a previous data transmission in each of the different transmission paths,
wherein when the responses to previous data transmissions indicate that the transmission data in the previous data transmissions has failed to be received at least a predetermined number of consecutive times in one of the transmission paths, said data dividing unit divides the data such that there are no subsequent transmissions in the one transmission path.

3. A transmitting apparatus, comprising:
a data dividing unit to divide data into pieces of data to be transmitted;
a data outputting unit to add a distribution order to the divided pieces of data to form transmission data;
a transmitter to transmit the transmission data in different transmission paths simultaneously; and
a response determining unit to determine a response to a previous data transmission in each of the different transmission paths,
wherein when said response determining unit determines that the responses to previous data transmissions have successfully been received at least a predetermined number of times in one of the transmission paths, said data dividing unit divides the data such that subsequent transmissions are made in the one transmission path.

4. A transmitting apparatus, comprising:
a data dividing unit to divide data into pieces of data to be transmitted;
a data outputting unit to add a distribution order to the divided pieces of data to form transmission data;
a transmitter to transmit the transmission data in different transmission paths simultaneously; and
a response determining unit to determine a response to a previous data transmission in each of the different transmission paths,
wherein when said response determining unit determines that the responses to previous data transmissions have successfully been received at least a predetermined number of consecutive times in one of the transmission paths, said data dividing unit divides the data such that subsequent transmissions are made in the one transmission path.

5. A transmitting apparatus, comprising:
a data dividing unit to divide data into pieces of data to be transmitted;
a data outputting unit to add a distribution order to the divided pieces of data to form transmission data;
a transmitter to transmit the transmission data in different transmission paths simultaneously; and
a response determining unit to determine a response to a previous data transmission in each of the different transmission paths,
wherein when the responses to previous data transmissions indicate that the transmission data in the previous data transmissions has failed to be received at least a predetermined number of times in one of the transmission paths, said data dividing unit divides the data such that subsequent transmissions in the one transmission path are made in a modulation mode having a higher noise resistance than the noise resistance of the previous modulation mode.

6. A transmitting apparatus, comprising:
a data dividing unit to divide data into pieces of data to be transmitted;
a data outputting unit to add a distribution order to the divided pieces of data to form transmission data;
a transmitter to transmit the transmission data in different transmission paths simultaneously; and
a response determining unit to determine a response to a previous data transmission in each of the different transmission paths,
wherein when the responses to previous data transmissions indicate that the transmission data in the previous data transmissions has failed to be received at least a predetermined number of consecutive times in one of the transmission paths, said data dividing unit divides the data such that subsequent transmissions in the one transmission path are made in a modulation mode having a higher noise resistance than the noise resistance of the previous modulation mode.

7. A transmitting apparatus, comprising:
a data dividing unit to divide data into pieces of data to be transmitted;
a data outputting unit to add a distribution order to the divided pieces of data to form transmission data;

a transmitter to transmit the transmission data in different transmission paths simultaneously; and a response determining unit to determine a response to a previous data transmission in each of the different transmission paths, wherein when said response determining unit determines that the responses to previous data transmissions have successfully been received at least a predetermined number of times in one of the transmission paths, said data dividing unit divides the data such that subsequent transmissions in the one transmission path are made in a modulation mode having a lower noise resistance than the noise resistance of the previous modulation mode.

8. A transmitting apparatus, comprising:

a data dividing unit to divide data into pieces of data to be transmitted;

a data outputting unit to add a distribution order to the divided pieces of data to form transmission data;

a transmitter to transmit the transmission data in different transmission paths simultaneously; and a response determining unit to determine a response to a previous data transmission in each of the different transmission paths, wherein when said response determining unit determines that the responses to previous data transmissions have successfully been received at least a predetermined number of consecutive times in one of the transmission paths, said data dividing unit divides the data such that subsequent transmissions in the one transmission path are made in a modulation mode having a lower noise resistance than the noise resistance of the previous modulation mode.

9. A transmitting apparatus, comprising:

a data dividing unit to divide data into pieces of data to be transmitted;

a data outputting unit to add a distribution order to the divided pieces of data to form transmission data;

a transmitter to transmit the transmission data in different transmission paths simultaneously; and a carrier sense unit to report a state of availability of each of the transmission paths prior to data transmission, wherein said transmitter does not transmit the transmission data in a selected transmission path reported to be unavailable by said carrier sense unit even when the selected transmission path becomes available after the data transmission is started in transmission paths other than the selected transmission path.

* * * * *